US009279283B2

(12) United States Patent
Briese et al.

(10) Patent No.: US 9,279,283 B2
(45) **Date of Patent: *Mar. 8, 2016**

(54) AUTOMATED SPACER FRAME FABRICATION

(75) Inventors: William A. Briese, Hinkley, OH (US); Timothy B. McGlinchy, Twinsburg, OH (US); John Grismer, Cuyahoga Falls, OH (US)

(73) Assignee: GED Integrated Solutions, Inc., Twinsburg, OH (US)

( * ) Notice: Subject to any disclaimer, the term of this patent is extended or adjusted under 35 U.S.C. 154(b) by 1079 days.

This patent is subject to a terminal disclaimer.

(21) Appl. No.: 13/157,827

(22) Filed: Jun. 10, 2011

(65) Prior Publication Data

US 2012/0011722 A1 Jan. 19, 2012

Related U.S. Application Data

(60) Provisional application No. 61/364,848, filed on Jul. 16, 2010.

(51) Int. Cl.

| | |
|---|---|
| ***E06B 3/673*** | (2006.01) |
| ***B23P 15/00*** | (2006.01) |
| ***B21D 53/74*** | (2006.01) |

(52) U.S. Cl.

CPC ............ *E06B 3/67308* (2013.01); *B21D 53/74* (2013.01); *E06B 3/67313* (2013.01); *Y10T 29/49623* (2015.01); *Y10T 29/49798* (2015.01); *Y10T 29/49995* (2015.01); *Y10T 29/5136* (2015.01); *Y10T 29/5197* (2015.01);

(Continued)

(58) Field of Classification Search

CPC ............ Y10T 29/5197; Y10T 29/5198; Y10T 29/5136; E06B 3/67308; E06B 3/67313

USPC ........................................ 29/33 Q, 33 S, 564

See application file for complete search history.

(56) References Cited

U.S. PATENT DOCUMENTS 3,318,235 A * 5/1967 Hanni ............................ 83/529
3,333,447 A * 8/1967 Alspaugh .................... 72/31.13

(Continued)

OTHER PUBLICATIONS

Machinery's Handbook, 25$^{th}$ ed., pp. 1240-1243, copyright 1996.*

(Continued)

*Primary Examiner* — Erica E Cadugan

(74) *Attorney, Agent, or Firm* — Tarolli, Sundheim, Covell & Tummino LLP

(57) ABSTRACT

Method and Apparatus for fabricating a spacer frame for use in an insulating glass unit. One of a multiple number of possible spacer frame materials is chosen for the spacer frame. An elongated strip of the material is moved to a notching station where notches are formed at corner locations. The character of the notches is adjusted based on the selection of the metal strip material and more particularly to achieve bending of the material in an repeatable, straightforward manner. Better control over the notching process is also achieved by exhaust flow control of a double acting cylinder. A positioning spacer achieve very accurate side to side positioning of a die and anvil to precisely notch and deform the metal strip. Downstream from the notching station the metal strip is bent into a channel shaped elongated frame member having side walls. Further downstream a leading strip of channel shaped material is severed or separated from succeeding material still passing through the notching and bending station.

22 Claims, 21 Drawing Sheets

(52) U.S. Cl.
CPC .......... *Y10T29/5198* (2015.01); *Y10T 83/8699* (2015.04); *Y10T 83/8864* (2015.04); *Y10T 83/9309* (2015.04); *Y10T 83/949* (2015.04)

(56) References Cited

U.S. PATENT DOCUMENTS

| | | | | |
|---|---|---|---|---|
| 4,377,084 | A * | 3/1983 | Kaminski | 72/325 |
| 5,361,476 | A * | 11/1994 | Leopold | 29/417 |
| 5,361,749 | A | 11/1994 | Smith et al. | |
| 6,678,938 | B2 | 1/2004 | McGlinchy et al. | |
| 7,448,246 | B2 | 11/2008 | Briese et al. | |
| 7,610,681 | B2 | 11/2009 | Calcei et al. | |
| 2006/0075869 | A1* | 4/2006 | Calcei et al. | 83/650 |
| 2014/0260491 | A1* | 9/2014 | Briese et al. | 72/338 |

OTHER PUBLICATIONS

"Festo: Precision Adjustment and Control—With Flow Control Valves from Festo"; three pages, Aug. 2005.*

The crimping finger shown in Figure 20 of the present patent application was in public use (as understood in 35 U.S.C. 102(b)) in conjunction with a system showin in U.S. Pat. No. 7,448,246 to Briese et al. in the United States for more than one year before the present application's filing date of Jun. 10, 2011.

"Festo Precision Adjustment and Control—with Flow Control valves from Festo", Published 2005, seven (7) pages.

Description of Intercept~L-3® spacer frame manufacturing machines at paragraph 6 of Briese declaration that was on sale on Jul. 15, 2009; three (3) pgs.

* cited by examiner

AUTOMATED SPACER FRAME FABRICATION

CROSS REFERENCE TO RELATED APPLICATION

The present application claims priority from U.S. Provisional patent application Ser. No. 61/364,848 having a filing date of Jul. 16, 2010 which is incorporated herein by reference for all purposes.

TECHNICAL FIELD

The present disclosure relates to a method and apparatus for fabricating a spacer frame for use in making a window or door.

BACKGROUND

Insulating glass units (IGUs) are used in windows and doors to reduce heat loss from building interiors during cold weather. IGUs are typically formed by a spacer assembly sandwiched between glass lites. A spacer assembly has a frame structure extending peripherally about the insulating glass unit. A sealant material bonds the glass lites to the frame structure and a desiccant for absorbing atmospheric moisture within the unit, trapped between the lites. The margins or the glass lites are flush with or extend slightly outwardly from the spacer assembly. The sealant extends continuously about the frame structure periphery and its opposite sides so that the space within the IGUs is hermetic.

U.S. Pat. No. 5,361,476 to Leopold discloses a method and apparatus for making IGUs wherein a thin flat strip of sheet material is continuously formed into a channel shaped spacer frame having corner structures and end structures, the spacer thus formed is cut off, sealant and desiccant are applied and the assemblage is bent to form a spacer assembly.

U.S. Pat. No. 7,610,681 to Calcei et al. (hereinafter "the '681 Patent") concerns spacer frame manufacturing equipment wherein a stock supply station includes a number of rotatable sheet stock coils, an indexing mechanism for positioning one of the coils, and an uncoiling mechanism. Multiple other processing stations act on the elongated strip of sheet stock uncoiled from the stock supply station. The disclosure of the '681 Patent is incorporated herein by reference.

U.S. Pat. No. 7,448,246 to Briese et al. (hereinafter "the 246 Patent") concerns another spacer frame manufacturing system. As discussed in the '246 Patent, spacer frames depicted are initally formed as a continuous straight channel constructed from a thin ribon of stainless steel material e.g., 304 stainless steel having a thickness of 0.006-0.010 inches. As noted, other materials such as galvanized, tin plated steel, or aluminum can be used to construct the spacer frame. The disclosure of the '246 Patent to Briese et al. is also incorporated herein by reference. Typical thickness for these other materials range from 0.006 to 0.025 inches in thickness.

SUMMARY

A disclosed system and method fabricates window components such as a spacer frame used in making an insulating glass unit. One of a multiple number of possible materials is chosen from which to make the window component. An elongated strip of the chosen material is moved to a notching station where notches are formed at corner locations. The character of the notches is adjusted based on the selection of the strip material and more particularly to achieve bending of the material at the corner locations in an repeatable, attractive manner. Downstream from the notching station in the example of a spacer frame, the strip is bent into a channel shaped elongated frame member having side walls. Further downstream a leading portion of channel shaped material that forms a forwardmost spacer frame is severed or separated from succeeding material still passing through the notching and bending stations.

Different alternative example embodiments for controlling the quality of the corners produced at the notching station are disclosed. It is important to apply sufficient force to the weakened (coined) zone of a corner to facilitate proper folding characteristics. Too little force can result in the corner not folding properly or at all, and too much force can result in the weakened (coined) zone of a corner to become completely removed, or clipped out, from the elongated strip.

In one example embodiment the notching station punches corner locations using dies on opposite sides of the strip stock. A first adjustable die assembly includes a first die mounted for back and forth movement perpendicular to a strip stock path of travel to accommodate different width strip stock. A second die assembly includes a second die is positioned on an opposite side of the strip stock path of travel from the first die. A ram assembly controllably drives the dies into engagement with the strip stock to form a corner location. Accurate positioning of the first die is performed by fixing a reference surface in a position based on a width of the strip stock and trapping an adjustable width spacer element between the reference surface and a die assembly surface of the adjustable die assembly that is generally parallel to the reference surface.

In one specific example embodiment, the adjustable width spacer has a body portion that includes first and second outer cylindrical surfaces having a stepped region. A sleeve fits over a small diameter cylindrical surface of the body portion. One or more annular spacers define a spacing between one end of the sleeve and an opposite end of the body portion when abutting the sleeve and the stepped region of the body. This spacer is quite accurate in positioning the first or moveable die and does this positioning without any racking or misalignment of the spacer. This in turn results in reduced friction in the notching station and increases the consistency of corner formation. For example, guides which support and define the movement of the ram assembly with respect to the strip stock are located in prescribed positions reducing friction and misalignment.

In accordance with another example embodiment, a corner forming station has a dual acting fluid powered actuator for moving a die into contact with a surface of the strip stock at controlled corner locations along a length of the strip stock. The fluid actuator includes a variable release valve for relieving pressure at a controlled rate in one chamber while fluid is pressurizing a second chamber of the actuator. By regulating the release of the fluid from one pressurized chamber more consistency in corner formation is achieved regardless of the material passing through the corner forming station.

These and other features of the disclosure will become more fully understood by a review of a description of an exemplary system when reviewed in conjunction with the accompanying drawings.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals refer to like parts unless described otherwise throughout the drawings and in which.

DETAILED DESCRIPTION

Figure 1:
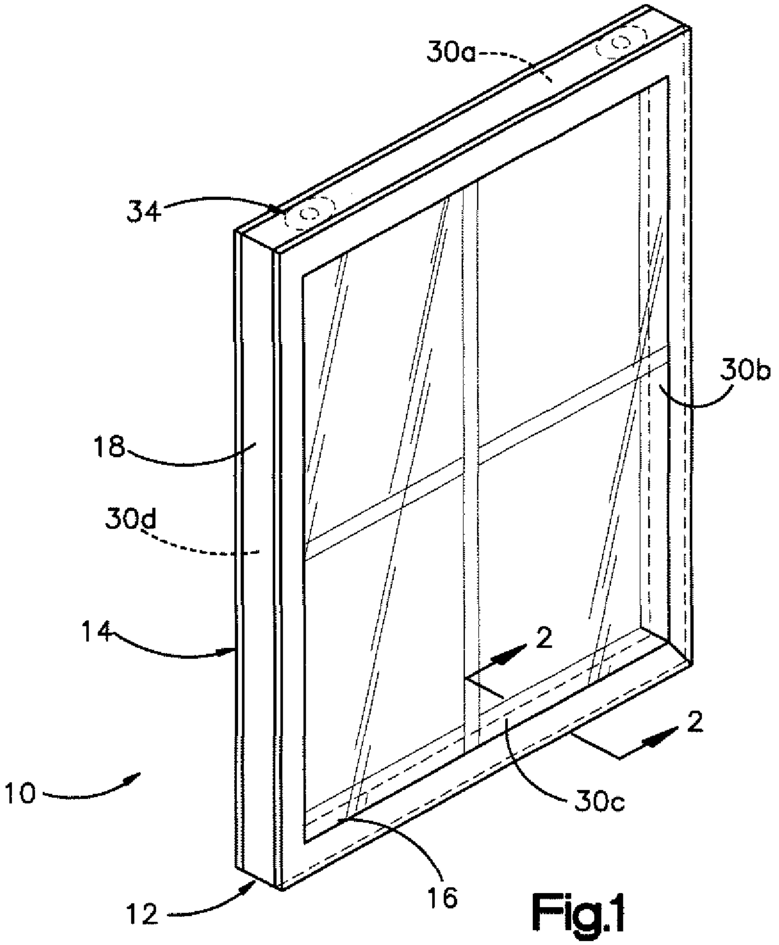
FIG. 1 is a perspective view of an insulating glass unit.

Referring now to the figures generally wherein like numbered features shown therein refer to like elements throughout unless otherwise noted. The present disclosure provides both a method and apparatus for fabricating a spacer frame for use in making a window or door. More specifically, the drawing Figures and specification disclose a method and apparatus for producing elongated spacer frames used in making insulating glass units. The method and apparatus are embodied in a production line that forms material into spacer frames for completing the construction of insulating glass units. While an exemplary system fabricates metal frames, the disclosure can be used with plastic frame material extruded into elongated sections having corner notches.

IGUs

Figure 2:
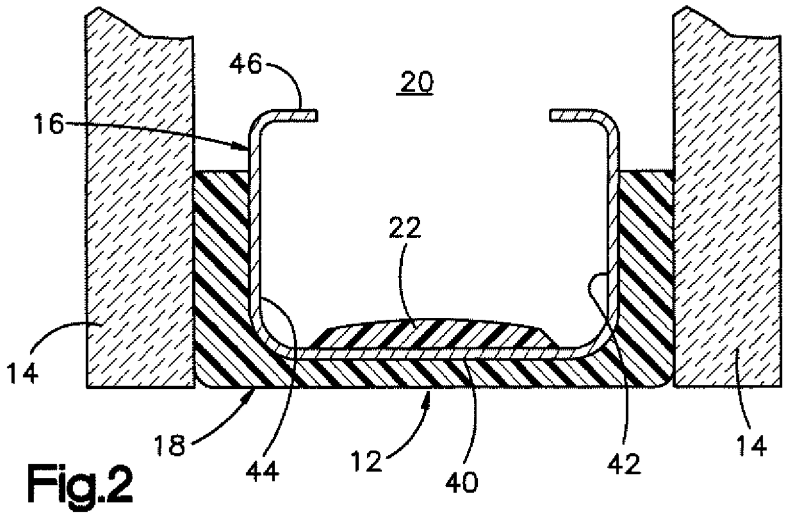
FIG. 2 is section view as seen from the plane 2-2 of FIG. 1.

An insulating glass unit (IGU) 10 is illustrated in FIG. 1. The IGU 10 includes a spacer assembly 12 sandwiched between glass sheets, or lites, 14 (FIG. 2). The assembly 12 comprises a frame structure 16 and sealant material 18 for hermetically joining the frame to the lites to form a closed space 20 within the unit 10. The unit 10 is illustrated in FIG. 1 as in condition for final assembly into a window or door frame, not illustrated, for ultimate installation in a building. The unit 10 illustrated in FIG. 1 includes muntin bars that provide the appearance of individual window panes.

The assembly 12 maintains the lites 14 spaced apart from each other to produce a hermetic insulating space 20 between them. The frame 16 and the sealant body 18 co-act to provide a structure which maintains the lites 14 properly assembled with the space 20 sealed from atmospheric moisture over long time periods during which the unit 10 is subjected to frequent significant thermal stresses. A desiccant 22 removes water vapor from air, or other volatiles, entrapped in the space 20 during construction of the unit 10.

The sealant 18 both structurally adheres the lites 14 to the spacer assembly 12 and hermetically closes the space 20 against infiltration of airborne water vapor from the atmosphere surrounding the unit 10. One suitable sealant 18 is formed from a "hot melt" material which is attached to the frame 16 sides and outer periphery to form a U-shaped cross section.

Figure 3:
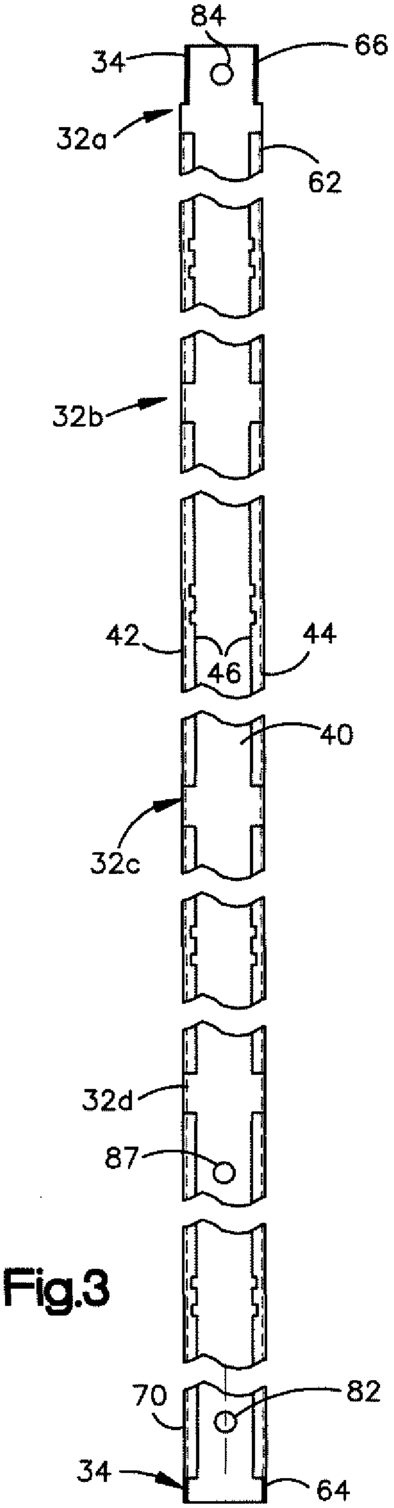
FIGS. 3 and 4 are top and side views of a spacer frame (prior to being folded into a closed-multi-sided frame) that forms part of the FIG. 1 insulating glass unit.

The frame 16 extends about the unit's periphery to provide a structurally strong, stable spacer 12 for maintaining the lites 14 aligned and spaced while minimizing heat conduction between the lites via the frame. The preferred frame 16 comprises a plurality of spacer frame segments, or members, 30*a-d* connected to form a planar, polygonal frame shape, element juncture forming frame corner structures 32*a-d*, and connecting structure 34 (FIG. 3) for joining opposite frame element ends to complete the closed frame shape.

The preferred frame 16 is elongated and has a channel shaped cross section defining a peripheral wall 40 and first and second lateral walls 42, 44. See FIG. 2. The peripheral wall 40 extends continuously about the unit 10 except where the connecting structure 34 joins the two frame member ends. The lateral walls 40, 42 extend inwardly from the peripheral wall 40 in a direction parallel to the planes of the lites 14 and the frame 16. The illustrated frame 16 has stiffening flanges 46 formed along the inwardly projecting lateral wall edges. The lateral walls 42, 44 add rigidity to the frame member 30 so it resists flexure and bending in a direction transverse to its longitudinal extent. The flanges 46 stiffen the walls 42, 44 so they resist bending and flexure transverse to their longitudinal extents.

Figure 4:
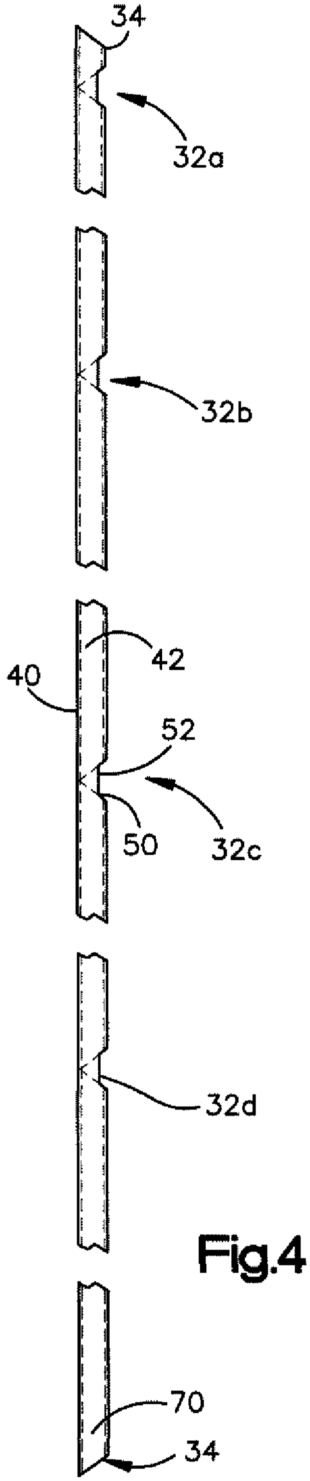

The frame 16 is initially formed as a continuous straight channel constructed from a thin ribbon of material. As described more fully below, the corner structures 32*a*-32*d* are made to facilitate bending the frame channel to the final, polygonal frame configuration in the unit 10 while assuring an effective vapor seal at the frame corners. A sealant is applied and adhered to the channel before the corners are bent. The corner structures initially comprise notches 50 and weakened zones 52 formed in the walls 42, 44 at frame corner locations. See FIG. 4. The notches 50 extend into the walls 42, 44 from the respective lateral wall edges. The lateral walls 42, 44 extend continuously along the frame 16 from one end to the other. The walls 42, 44 are weakened at the corner locations because the notches reduce the amount of lateral wall material and eliminate the stiffening flanges 46 and because the walls are stamped or coined to weaken them at the corners.

At the same time the notches 50 are formed, the weakened zones 52 are formed. These weakened zones 52 are cut into the strip, but not all the way through. The connecting structure 34 secures the opposite frame ends 62, 64 together when the frame 16 has been bent to its final configuration. The illustrated connecting structure comprises a connecting tongue structure 66 continuous with and projecting from the frame structure end 62 and a tongue receiving structure 70 at the other frame end 64. The preferred tongue and tongue receiving structures 66, 70 are constructed and sized relative to each other to form a telescopic joint. When assembled, the telescopic joint maintains the frame 16 in its final polygonal configuration prior to assembly of the unit 10.

The Production Line 100

Figure 5:
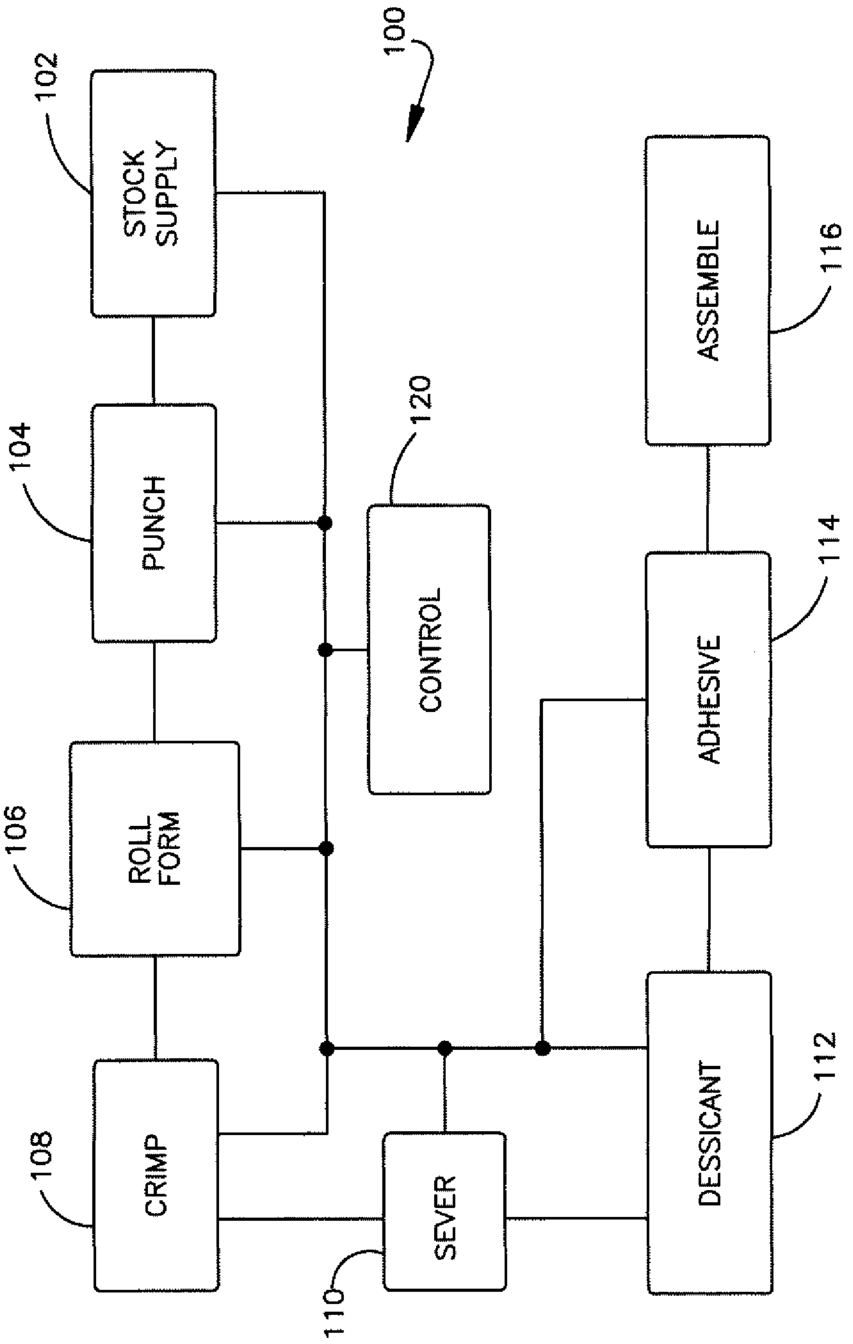
FIG. 5 is a schematic depiction of a production line for use with the invention.

As indicated previously the spacer assemblies 12 are elongated window components that may be fabricated by using the method and apparatus of the present invention. Elongated window components are formed at high rates of production. The operation by which elongated window components are fashioned is schematically illustrated in FIG. 5 as a production line 100 through which a thin, relatively narrow ribbon of sheet metal stock is fed endwise from a coil into one end of the assembly line and substantially completed elongated window components emerge from the other end of the line 100.

The line 100 comprises a stock supply station 102, a punching station 104, a roll forming station 106, a crimper station 108, and a severing station 110 where partially formed spacer members are separated from the leading end of the stock. At a desiccant application station 112 desiccant is applied to an interior region of the spacer frame member. At an extrusion station 114 sealant is applied to the yet to be folded frame member. A scheduler/motion controller unit 120 interacts with the stations and loop feed sensors to govern the spacer stock size, spacer assembly size, the stock feeding speeds in the line, and other parameters involved in production. At an assembly station 116, the glass lites are affixed to the frame and sent to an oven for curing.

Figure 6:
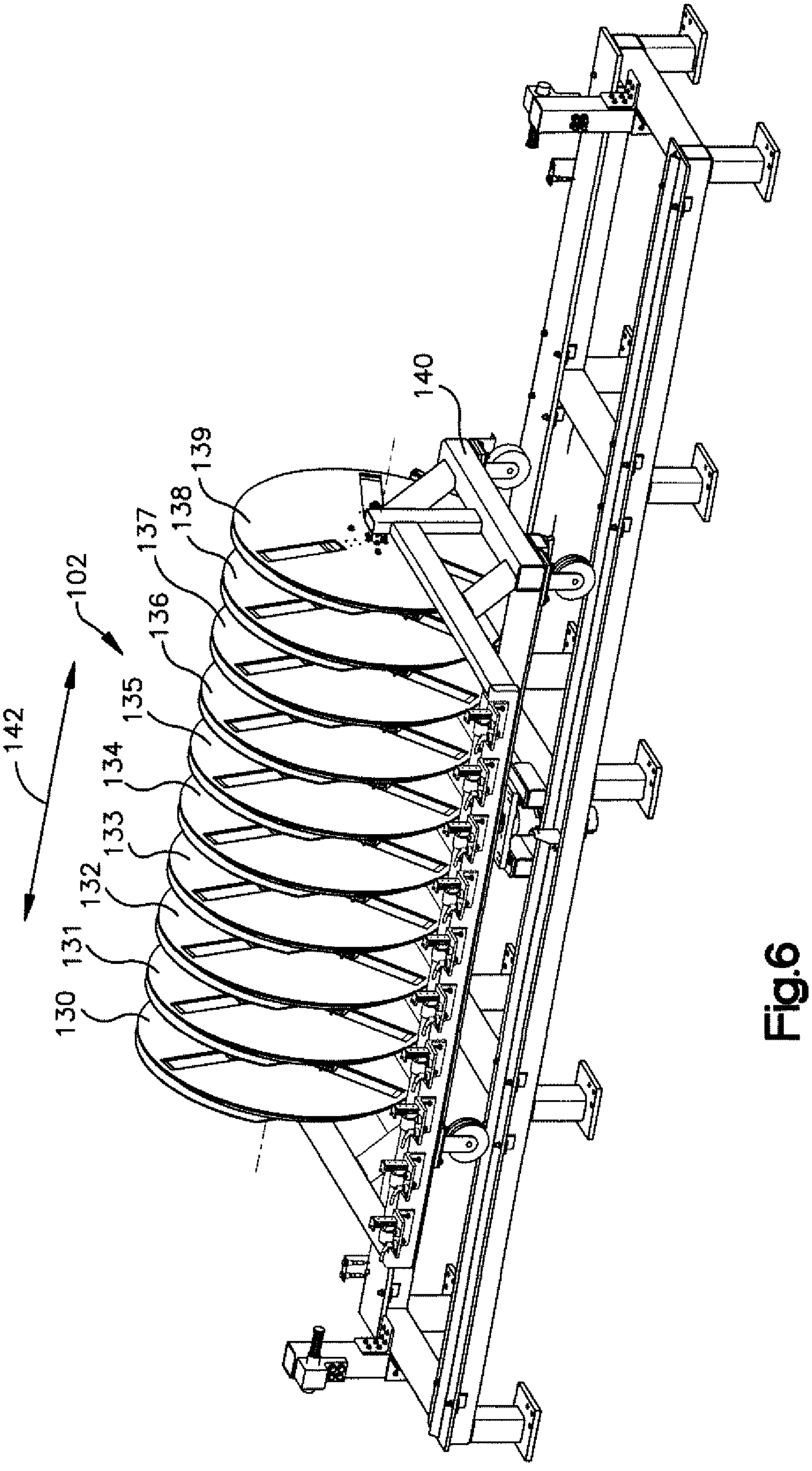
FIG. 6 is a perspective view of a stock supply station.

As described more fully in the Calcei et al. patent, elongated coils 130-139 (FIG. 6) are supported to a carriage 140 for back and forth movement in the direction of the double ended arrow 142. One of the multiple coils is moved by the controller 120 to an uncoiling position for delivering a selected strip of sheet stock material to the downstream stations depicted in FIG. 5.

The scheduler/motion controller unit 120 interacts with the stations and loop feed sensors to govern the spacer stock size, spacer assembly size, the stock feeding speeds in the line, and other parameters involved in production. A preferred controller unit 120 is commercially available from Delta Tau, 21314 Lassen St, Chatsworth, Calif. 91311 as part number UMAC.

The Punching Station 104

The punching station 104 accepts the stock S from a properly positioned coil at the stock supply station and performs a series of stamping operations on the stock as the stock S passes through the punching station. The punching station 104 comprises a supporting framework 238 (FIG. 11) fixed to the factory floor. A stock driving system 140 moves the stock through the station until the stock is grasped by a downstream drive system 145 (FIG. 11) described in more detail in the Calcei et al. '681 Patent. Stamping units 144, 146, 148, 150, 152, 154 spaced along the station 104 in the direction of stock movement perform individual stamping operations on the stock S.

The illustrated stock driving system 140 includes a pair of rollers 156, 158 secured to the framework at an entrance to the punching station 104. The rollers 156, 158 are selectively moveable between a disengaged position in which the drive rollers are spaced apart and an engaged position in which the drive rollers engage an end portion of the strip S at the entrance of the punching station 104. The rollers 156, 158 selectively feed the sheet stock into the punching station 104.

In the illustrated embodiment, a drive roller 156 is selectively driven by a motor coupled to a drive shaft 162 that is controlled by the controller 120. An idle roller 158 is pivotally connected to its support framework. In the illustrated embodiment, the roller 158 is an idler roller that presses the sheet stock S against the roller 156 when the drive roller 156 is in the engaged position. The motor is controlled to feed the sheet stock through the station 104. In the illustrated embodiment, a sensor is positioned along the path of travel near the stamping station and creates an output for verifying that stock S is being fed.

The controller moves the pair of rollers 156, 158 to the disengaged, spaced apart position and indexes or moves an appropriate or selected sheet stock coil from the plurality of coils 130-139. At the uncoiling position, a feed mechanism positions the sheet stock end portion between the pair of rollers 156, 158. The controller 120 moves the pair of rollers 156, 158 to the engagement position to engage the coil end portion, and rotates the drive roller to feed the sheet stock into the punching station. In one embodiment, the stock driving system 140 is also used to withdraw stock from the stamping station 104 when strip stock of a different thickness, width or material is to fabricated into spacer frames.

In the disclosed system, a stock driving system 145 on an output side of the punching station 104 engages the stock provided by the stock driving system 140. The stock driving system 140 then disengages. The subsequent downstream drive system 145 has rolls that define a nip for securely gripping the stock and pulling it through the station 104 past a number of stamping units 144, 146, 148, 148', 150, 150', 152, 154. The downstream drive system includes an electric servomotor to start and stop with precision. Accordingly, stock passes through the station 104 at precisely controlled speeds and stops precisely at predetermined locations, all depending on signals from the controller 120.

Each stamping unit 144, 146, 148, 150, 152, 154 comprises a die assembly and a die actuator assembly, or ram assembly. Each die assembly comprises a die set having a lower die, or anvil, beneath the stock travel path and an upper die, or hammer, above the travel path. The stock passes between the dies as it moves through the station 104. Each hammer is coupled to its respective ram assembly. Each ram assembly forces its associated dies together with the stock between them to perform a particular stamping operation on the stock.

Each ram assembly is securely mounted atop the framework 238 and connected to a fluid supply source 542 (FIG. 22) of high pressure operating air via suitable conduits. Each ram assembly is operated from the controller 120, which outputs a control signal to a suitable or conventional ram controlling valve arrangement when the stock has been positioned appropriately for stamping.

The stamping unit 152 punches the connector holes 82, 84 (FIG. 3) in the stock at the leading and trailing end locations of each frame member 16. When included, a passage 87 is also punched in the stock by the unit 152. In the illustrated embodiment, the die set anvil for punching the holes 82, 84 defines a pair of cylindrical openings disposed on the stock centerline a precise distance apart along the stock path of travel. The corresponding hammer is formed in part by corresponding cylindrical punches, each aligned with a respective anvil opening and dimensioned to just fit within the aligned opening. The stamping unit ram is actuated to drive the punches downwardly through the stock and into their respective receiving openings. The stock is fed into the stamping unit 152 by the downstream driving system and stopped with predetermined stock locations precisely aligned with the stamping unit 152. The punches are actuated by the ram so that the connector holes 82, 84 are punched on the stock midline, or longitudinal axis. When the punches are withdrawn, the stock feed resumes.

Figure 14:
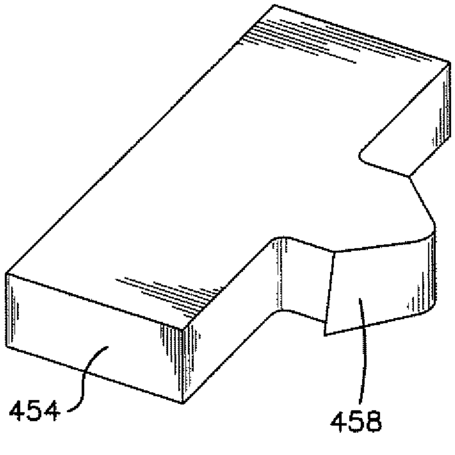

The stamping unit 148 forms the frame corner structures 32*b-d* but not the corner structure 32*a* adjacent the frame tongue 66. The stamping unit 148 includes a die assembly 280 (FIG. 7) operated by a ram assembly. The die assembly 280 punches material from respective stock edges to form the corner notches 50. The die assembly 280 also stamps the stock at the corner locations to define the weakened zones 52, which facilitate the folding of the spacer frame member at the corner locations. The ram assembly preferably comprises a pair of air actuated drive cylinders 290, 292 connected to an upper die drive plate 400. Each weakened zone 52 is illustrated as formed by a score line (more than one score line may be included) radiating from a corner bend line location on the stock toward the adjacent stock edge formed by the corner notch 50. The score line is formed on the stock strip S by a sharp edged ridge 457 disposed on a scoring tool 458 (FIG. 14, 14A) when contact occurs on the strip S between the scoring tool 458 and a flat surface or flat anvil. A face 459 of the tool 458 that engages the strip stock has a wedge shaped lip or ridge 457 spaced from two triangular elevated lands 461, 463. The elevated shaped lands 461, 463 bias the weakening zones 52 inward along the lateral walls 42, 44 at the notches 50. In the illustrated embodiment, the frame members 16 produced by the production line 100 have common side wall depths even though the frame width varies.

The stamping unit 150 configures the leading and trailing ends 62, 64 of each spacer frame member. The unit 150 comprises a die assembly operated by a ram assembly. The die assembly is configured to punch out the profile of the frame member leading end 62 as well as the profile of the adjoining frame member trailing end 64 with a single stroke. The leading frame end 62 is formed by the tongue 66 and the associated corner structure 32*a*. A trailing frame end 64 associated with the preceding frame member is immediately adjacent the tongue 66 and remains connected to the tongue 66 when the stock passes from the unit 150. The ram assembly comprises a pair of rams each connected to a hammer.

The corner structure 32*a* is generally similar to the corner structures 32*b-d* except the notches 50 associated with the corner 32*a* differ due to their juncture with the tongue 66. The die assembly therefore comprises a score line forming a ridge like the die set forming the remaining frame corners 32*b-d.*

The stamping unit 146 forms muntin bar clip mounting notches in the stock. The muntin bar mounting structures include small rectangular notches. The unit 146 comprises a ram assembly coupled to the notching die assembly. An anvil and hammer of the notching die assembly are configured to punch a pair of small square corner notches on each edge of the stock. Accordingly the ram assembly comprises a single ram which is sufficient to power this stamping operation. A single stroke of the ram actuates the die set to form the opposed notches simultaneously and in alignment with each other along the opposite stock edges.

Each time a new strip passes through the stamping station 104, a scrap piece of stock is formed that is followed by a connected first spacer frame defining length of stock in a given series of multiple spacer frames. In one embodiment, the scrap piece is defined by the punching station 104 whenever a different coil is indexed to the uncoiling station and fed into the punching station 104. The stamping unit 144 configures a leading edge of the scrap piece and trailing end 64 of the last spacer frame member in a series of spacer frame members formed from a particular coil from which the strip unwinds. The trailing edge of the scrap unit is formed by the stamping unit 150 when the leading edge of the first spacer in the next series of spacers formed from this particular sheet stock coil is stamped. The unit 144 comprises a die assembly operated by a ram assembly. The die assembly is configured to punch out the profile of the scrap piece leading end as well as the profile of the end 64 of the last frame member in the series of spacer frame members with a single stroke. The ram assembly comprises a pair of rams each connected to a hammer.

At the end of a series of spacer frame members, the stamping unit 144 forms the trailing end of the last spacer frame member in the series and the leading end of the scrap piece. The stock is then indexed to a stamping unit 154 where the connection between the end of the last spacer frame member and the leading end of the scrap piece is severed. The unit 154 comprises a die assembly operated by a ram assembly. The die assembly punches the material that spans the respective stock edges to sever the stock. The ram assembly preferably comprises a ram connected to the upper die.

A sensor detects the end of the last spacer frame in a series of spacer frame members. Upon detection of the severed end of the last spacer frame, the controller 120 causes the stock feed mechanism 140 to move the roller 156, 158 to the engaged position. The controller then actuates the motor to cause the drive roller to pull or retract the stock S out of the punching station 104 and position the stock end at the entrance to the punching station. The stock that forms the last spacer frame member in the series is driven out of the machine by the downstream stock driving mechanism. The controller then moves the stock feed mechanism 140 to the disengaged position to release the stock end. The stock end remains secured by a clamping mechanism (not shown). The controller 120 may then index the next selected coil to the uncoiling position and place the end of this next selected strip between the rollers 156, 158. The controller 120 then controls the stock feed mechanism to start the next series of spacer frame units.

In order to accommodate wider or narrower stock passing through the station 104, the die assembly is split into two parts. In one embodiment, one side of each die assembly is fixed and the opposite side of each split die assembly is adjustably movable toward and away from the corresponding fixed die assembly to allow different width spacer frames to be punched. Also, each anvil is split into two parts and each hammer is likewise split.

Figure 11:
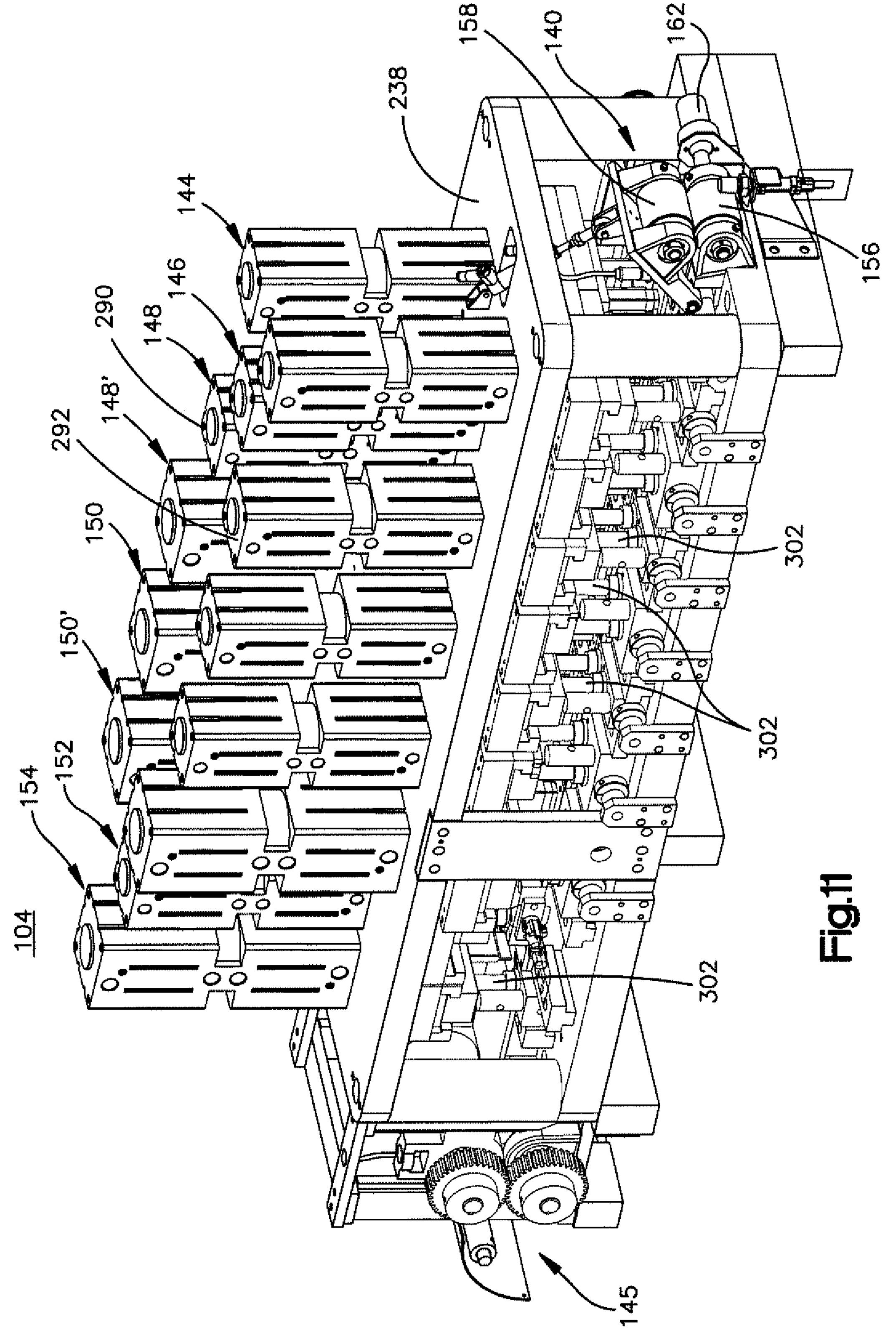
FIG. 11 is a perspective view of a punching station having side by side stamping units that are actuated by a controller based on the type of material of the strip material passing through the stamping unit.
Figure 12:
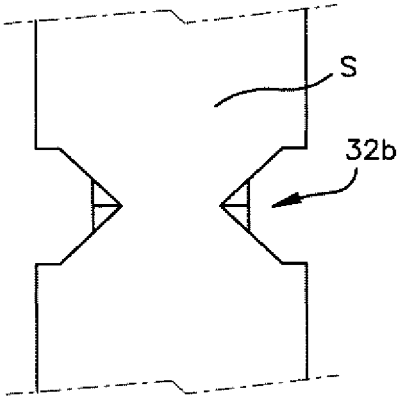
FIG. 12 is a plan view a portion of an elongated metal strip for use in forming a spacer frame.
Figure 13:
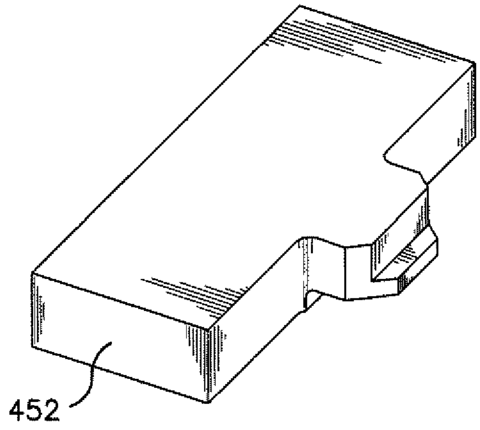
FIGS. 13, 13A, 14, and 14A are perspective views of a die set including a punching die and a deformation die.
Figure 13A:
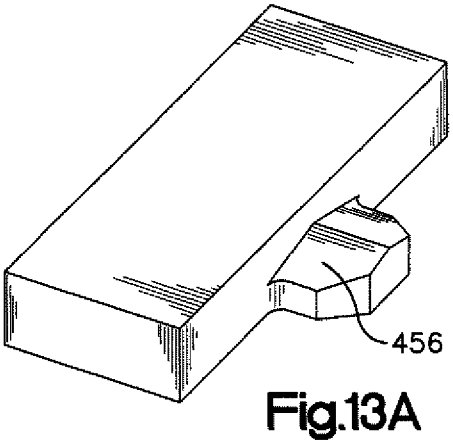
Figure 19:
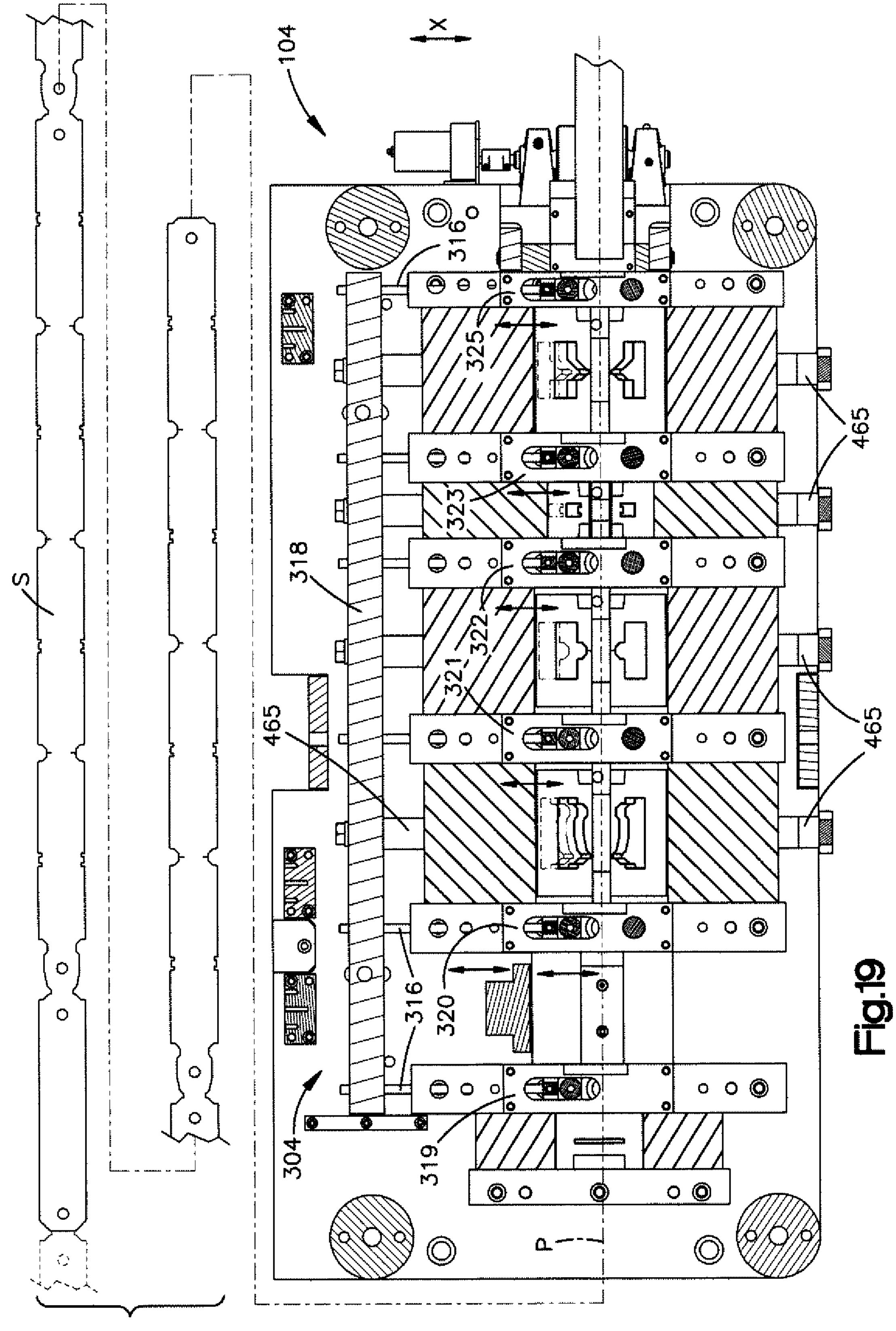
FIG. 19 is a section view of a punch station having a capability for moving a set of dies back and forth to accommodate different width stock.

FIGS. 11 and 19 illustrate an example embodiment having a fixed side array of dies wherein an opposite side of the strip S path of travel includes moveable die sets. The moveable opposed hammer and anvil parts are linked by vertically extending guide rods 302. The guide rods 302 are fixed in the hammer parts and slidably extend through bushings in the opposed anvil parts. The guide rods 302 both guide the hammers into engagement with their respective anvils and link the hammers and respective anvils so that all the hammers and anvils are adjusted laterally together.

Referring to FIG. 19, the moveable hammer and anvil parts of each die assembly that make up the punching station 104 are movable horizontally towards and away (see Arrows X in FIG. 19) from the fixed hammer and anvil parts by an actuating system 304 to desired adjusted positions for working on stock of different widths. The system 304 firmly fixes the die assembly parts at their horizontally adjusted locations for further frame production. The anvil parts of each die assembly are respectively supported in ways or guides attached to driving members 319, 320, 321, 322, 323, 325 attached to a stamping unit frame 238. The hammer parts of each die assembly are also each supported in ways or guides, which are coupled to a respective die actuator, or ram. The guides extend transversely to the travel path P of the stock strip S and the actuating system 304 shifts the hammer parts and the anvil parts simultaneously along the respective ways between adjusted positions.

The illustrated actuating system is controlled by the controller 120 to automatically adjust the punching station 104 for the stock width provided at the entrance of the station. The width of the stock provided to the station 104 may be detected and the controller automatically adjusts the station 104 to accommodate the detected width. The illustrated actuating system 304 provides positive and accurate moveable die assembly section placement relative to the stock path of travel. The system 304 comprises a plurality of drivescrews 316, a drive transmission 318 coupled to the drivescrews, and die assembly driving members 319, 320, 321, 322, 323, 325 driven by the drivescrews 316 and rigidly linking the drivescrews to the anvil parts. The drive transmission 318 is attached to a die spacer 465 (described below) which rigidly attaches to an anvil support.

The drivescrews 316 are disposed on parallel axes and mounted in bearing assemblies connected to lateral side frame members. Each drivescrew is threaded into its respective die assembly driving member 319, 320, 321, 322, 323, 325. Thus when the drivescrews rotate in one direction the driving members 319, 320, 321, 322, 323, 325 force their associated die sections (hammer and anvil) to shift horizontally away from the fixed die sections. Drivescrew rotation in the other direction shifts the die sections toward the fixed die sections. The threads on the drivescrews 316 are precisely cut so that the extent of lateral die section movement is precisely related to the angular displacement of the drivescrews creating the movement.

The hammer sections of the die assemblies are adjustably moved by the anvil sections. The guide rods 302 extending between confronting anvil and hammer die sections are structurally strong and stiff and serve to shift the hammer sections of the die assemblies horizontally with the anvil sections. The hammer sections are relatively easily moved along the upper platen guides or ways.

Figure 21:
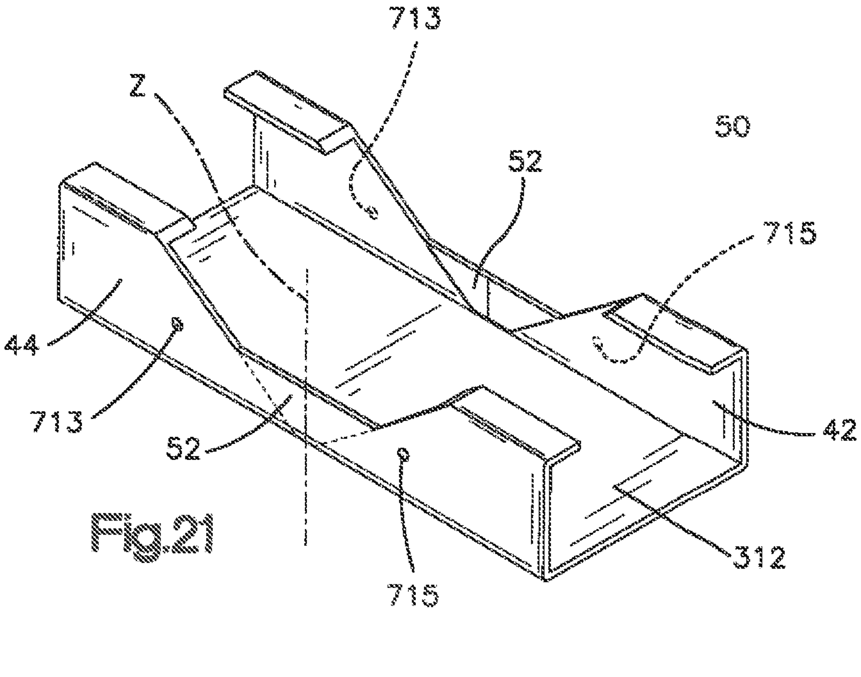
FIG. 21 is a perspective view of a section of strip stock after it has been passed through a roll former.

Once the strip S leaves the punching station 104, it enters a roll forming station 106 wherein a series of rolls contact the strip and bend it into a U-shaped channel or form 312 shown in FIG. 21. Roll formers for accepting elongated strip and conversing them into channel shaped elongated metal U shaped channels are know in the art and one example of such a roll former is commercially available from GED Integrated Solutions Inc., assignee of the present disclosure.

Controlled Corner Formation

As mentioned previously the ram assembly that forms part of the stamping unit 148 preferably comprises a pair of rams supported by the framework most preferably implemented using two air actuated drive cylinders 290, 292 commercially available from Festo Corp. under the designation or model number 13049375 or 13005438. An upper die assembly includes a drive plate 400 for at least two dies which move up and down (+/−⅜") as along the y axis seen in the elevation view of FIG. 7. Downward movement of the drive plate 400 attached to the two dies is limited by one or more ram limiting stops 410 having a contact region or surface 412 whose position with respect to a die support is adjusted depending on the material of the strip S passing through the station 104.

Figure 7:
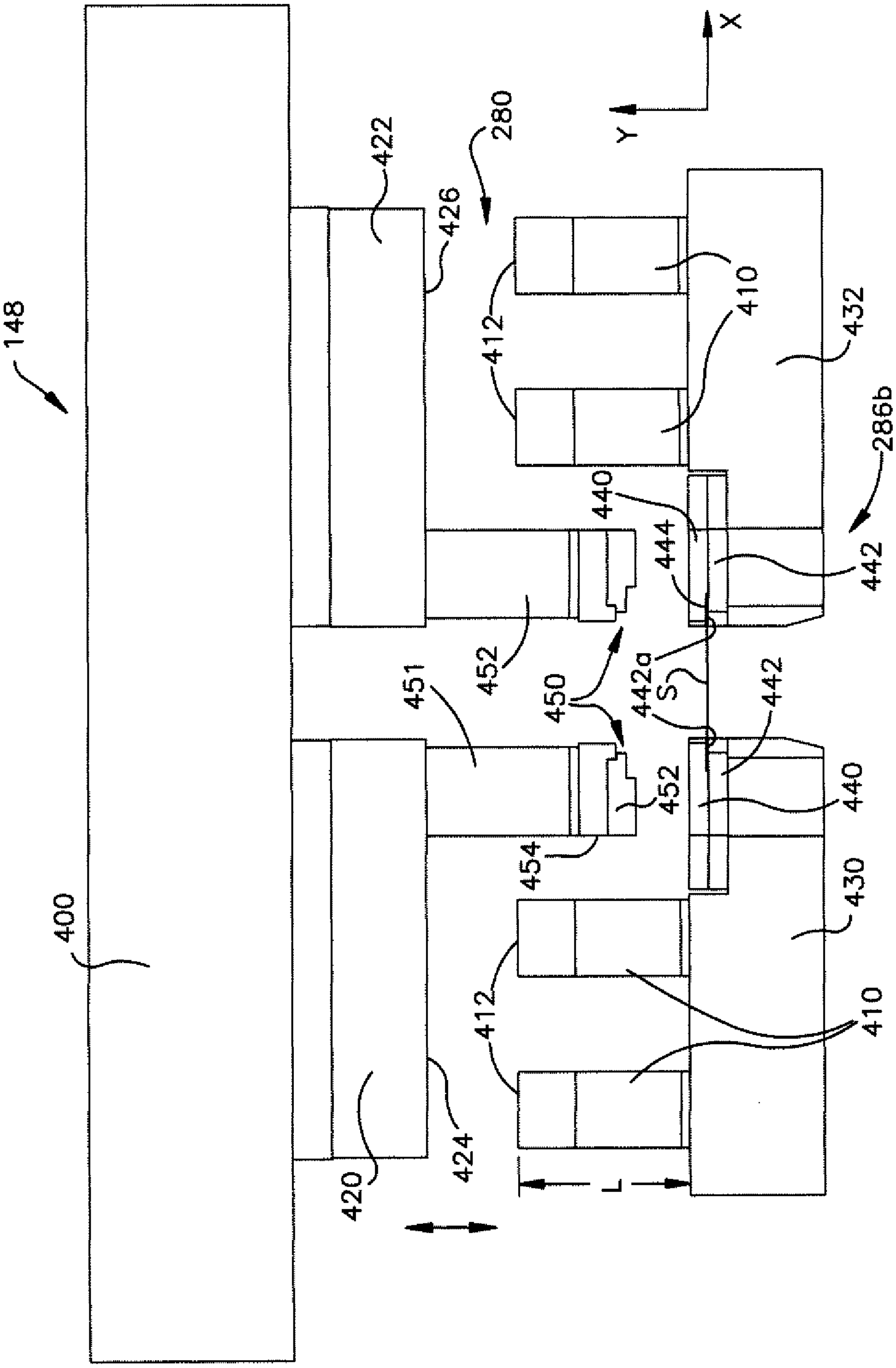
FIG. 7 is an elevation view of a corner stamping unit that forms part of a punch station.
Figure 15:
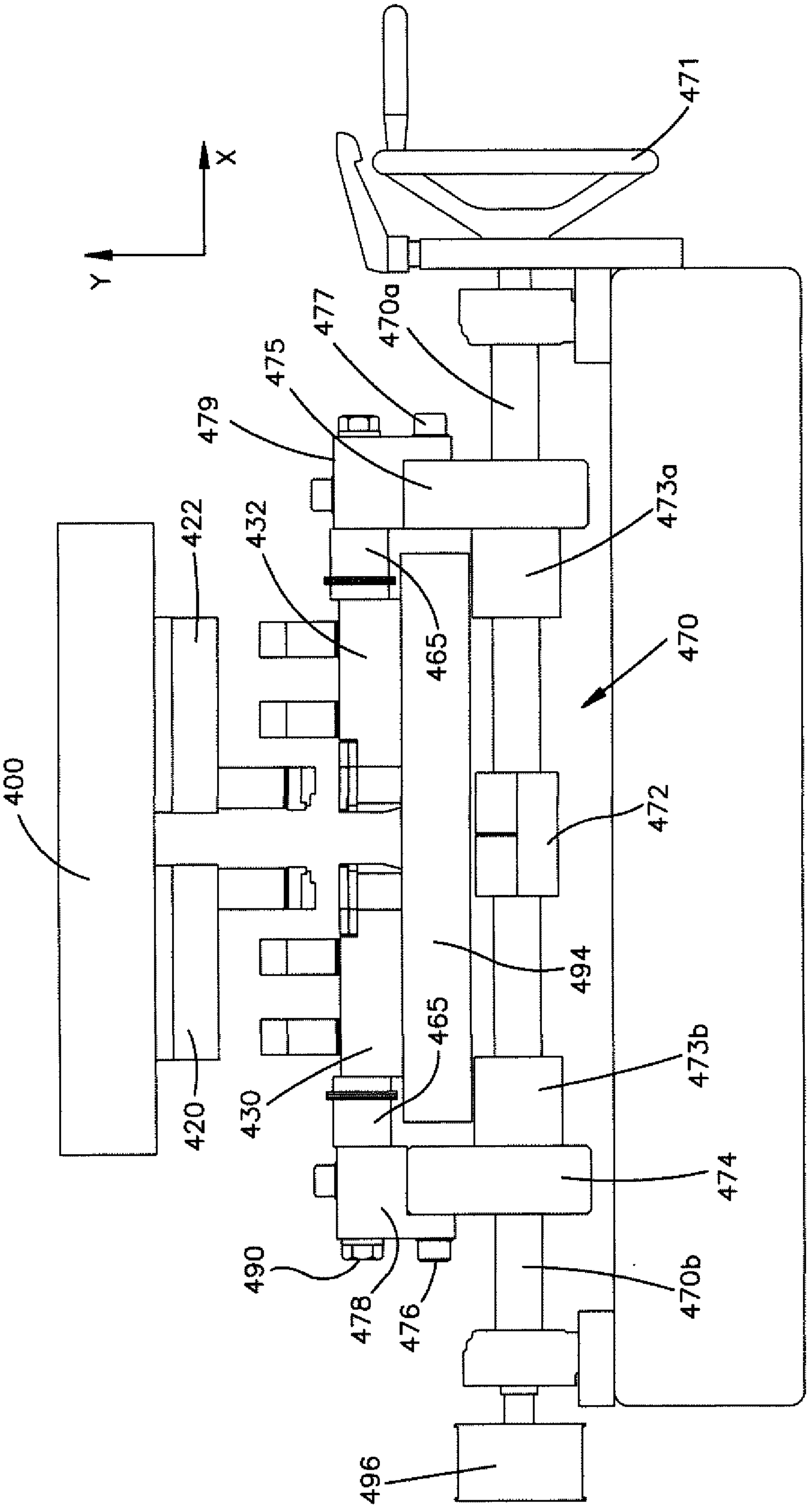
FIG. 15 is a side elevation view and FIG. 15A is a partially sectioned side view of a corner stamping unit having spacer elements that accurately position a strip with relation to a die as the strip moves into position for stamping.
Figure 15A:
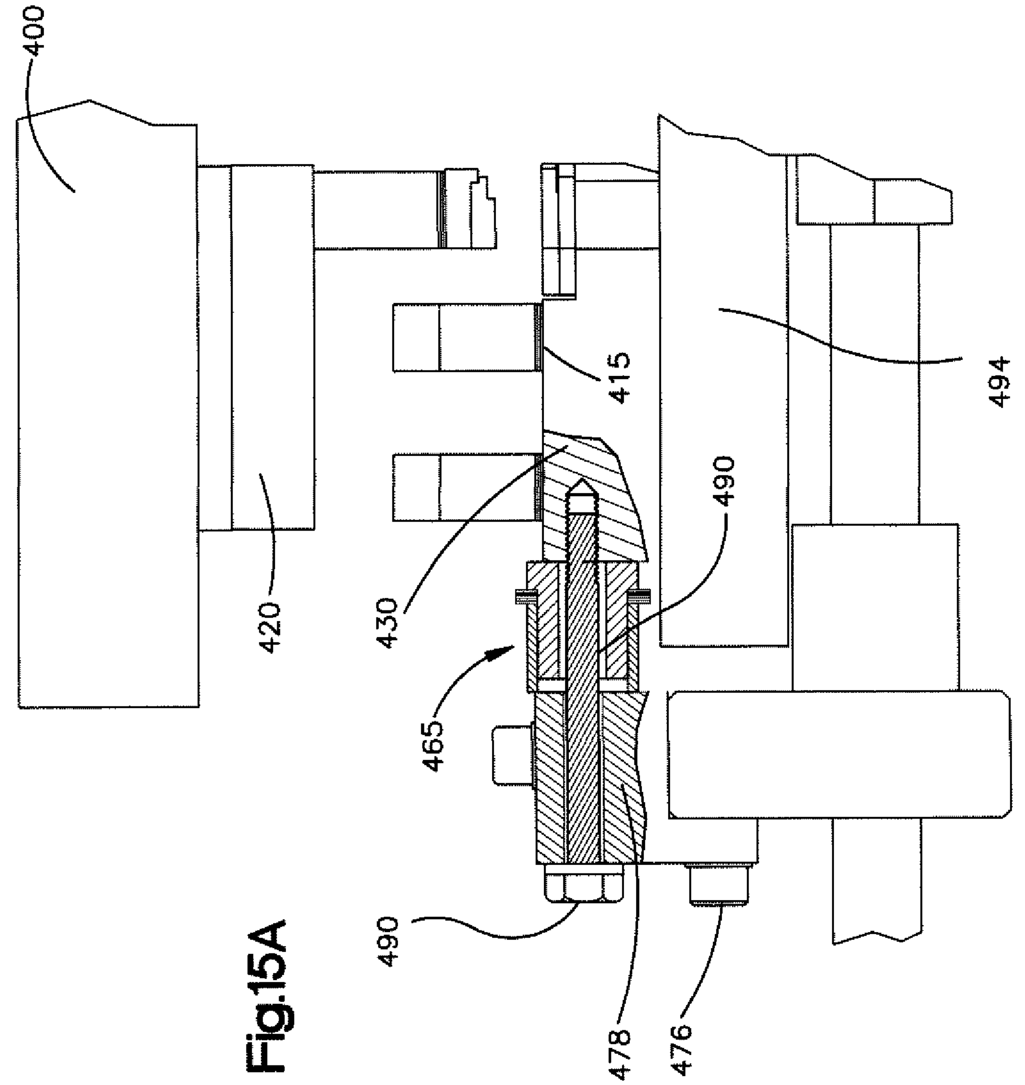

In an exemplary embodiment, the stamping unit has a first moveable die support 420 that supports one die for deforming one side of the strip S and a second moveable die support 422 that supports a second die for deforming an opposite side of the strip. These two die supports are coupled to the drive plate 400 for up and down movement with the drive plate in response to controlled actuation of the two air actuated drives 290, 292. In the embodiment of FIGS. 7 and 15, both dies can be shifted (+/− approximately inch in the X direction, see FIG. 7) to the side to accommodate different width strips S. When the two air actuated drive cylinders extend their pistons, the plate 400 is driven downward (−y) along with the attached die supports 420, 422 and bring the first and second dies into engagement with the strip. As seen most clearly in FIG. 7, bottom surfaces 424, 426 of the die supports engage the contact surfaces 412 of the stops 410 as a means of limiting movement of the dies and hence controlling the deformation of the strip S by those dies.

Figure 14A:
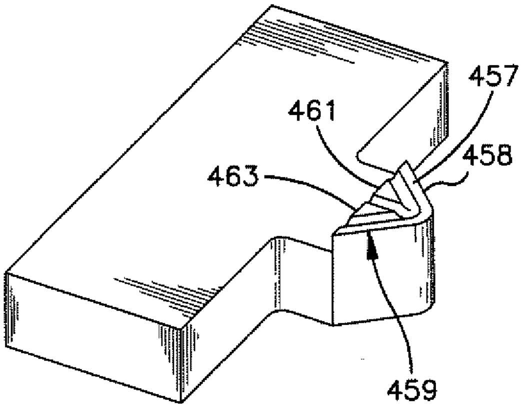

The stamping unit 148 has first and second moveable anvil supports 430, 432 each supporting a stripping element 440 that the die passes through to come in contact the strip S and a die contact or backing element 442. A region between the stripping element and the die contact element 442 defines a slot 444 which accommodates movement of the strip S through the punching station 104. Guide rollers (not shown) route the strip stock S (along the z direction) into the region of the die with great accuracy (within 5 thousands of an inch) so that the strip just passes through the slot 440 without binding. The die contact element 442 has a flat upwardly facing surface 442*a* which the die and particular the die ridge 459 (FIG. 14A) engages to deform the metal strip S when the metal strip is impacted by downward movement of the die.

A representative die 450 is removably connected to respective die holders 451, 453 and is depicted in FIGS. 13, 13A, 14, and 14A. The die 450 includes a notching portion 452 including a surface 456 for removing metal from the strip S and a deforming portion 454 for deforming a portion of the metal of the strip near the removed metal to facilitate formation of a corner.

In the illustrated example embodiment of FIG. 7, there are stops 410 on opposite sides of the strip S path of travel having upper facing, generally planar stop surfaces 412 which are contacted by the bottom surfaces 424, 426 of the die supports 420, 422 to limit transfer of energy from the dies to the strip and thereby control deformation of the strip.

Die/Anvil Positioning

Figure 27:
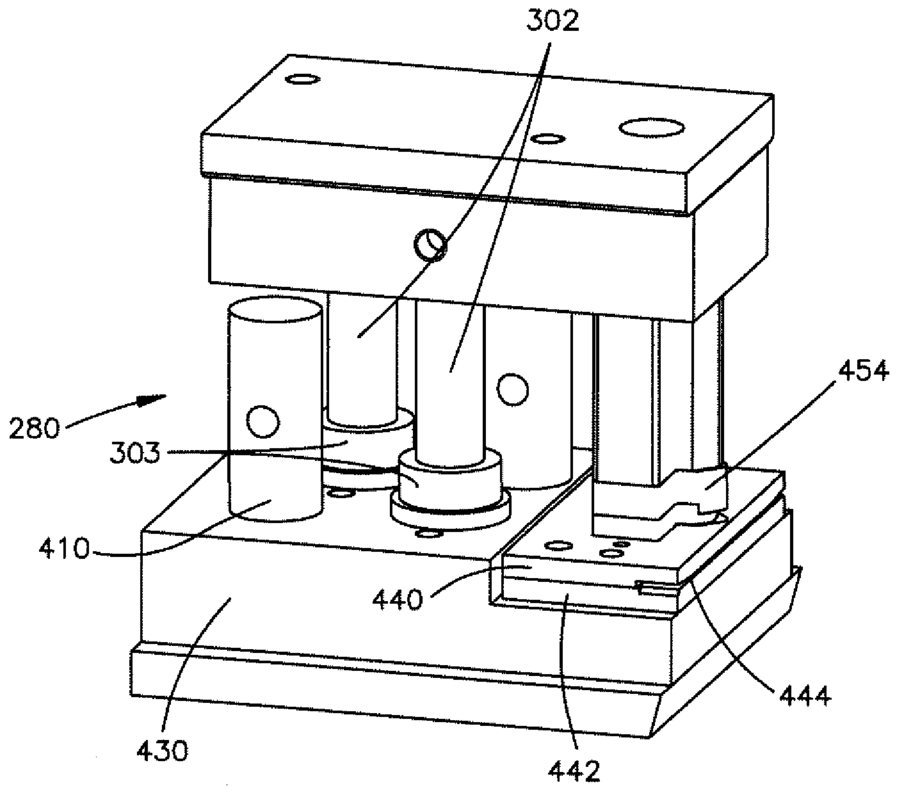
FIG. 27 is a perspective view of a die assembly for notching and stamping or coining a corner location of a spacer frame.
Figure 28:
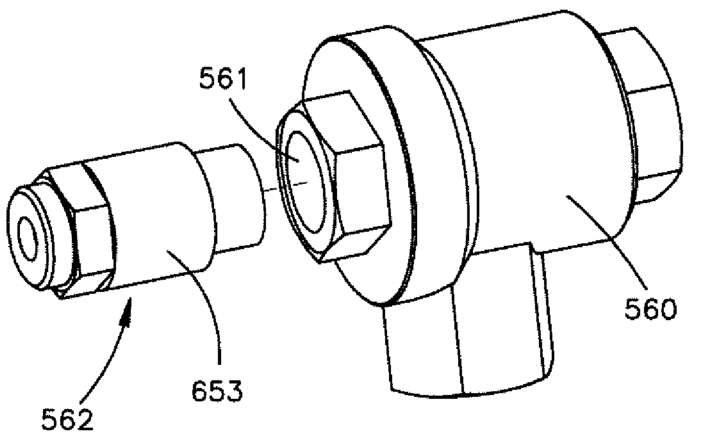
FIG. 28 is a perspective view of a flow control valve that forms part of the schematic of FIGS. 22 and 23.

As mentioned above, the first and second anvil supports 430, 432 are coupled to their respective die supports 420, 422 by connecting guides 302. This arrangement is further depicted in FIG. 27. The connecting guide 302 is securely attached to an associated die support and extends through bushings 303 supported by the anvil support. This construction allows up and down movement of the die supports with respect to their associated anvil supports. These guides support and define the movement of the ram assembly with respect to the strip stock and are located in prescribed positions reducing friction and misalignment Additionally as the anvil support is being translated back and forth to accept different width strip stock the guide 302 transmits a force to move the die support 420 relative the drive plate 400 in unison with the anvil support.

Unlike the example embodiment of FIG. 11, wherein only one set of anvil and dies are moved by control of the controller 120, the embodiment shown in FIG. 15 is adjusted by manual rotation of a drive screw 470 that is rotated by a hand crank 471 in one sense or the other to either widen or narrow the gap between the dies and respective anvils. The exemplary drive screw 470 is an acme screw having two halves 470*a*, 470*b* of different thread direction connected together by a coupling 472. Each half of the drive screw engages a corresponding drive nut so that for example the drive screw half 470*a* engages a drive nut 473*a* and the drive screw half 470*b* engages a drive nut 473*b*. In another embodiment not shown, the hand crank is replaced by a motor.

Two movable mounts 474, 475 are attached to the drive nuts 473*a*, 473*b* so that as rotation of the screw halves moves the drive nuts, the mounts 474, 475 move as well. Due to the reverse threads used in the screw halves, the mounts 474, 475 move in opposite directions along the x axis as that axis is defined in FIG. 15. As the mount 474 moves in the positive x direction for example, the mount 475 moves in the negative x direction.

Threaded connectors 476, 477 attach removable stops or posts 478, 479 to the mounts 474, 475 so that the stops move back and forth with the mounts as the screw halves are rotated. As seen also in FIG. 15, an adjustable spacer 465 is trapped or wedged between a reference surface of the removable stops 478, 479 and the anvil supports 430, 432. These spacers 465 have two surfaces 480, 481 (FIG. 26) trapped between a generally planar reference surface of a removable stop and an anvil support.

Figure 29:
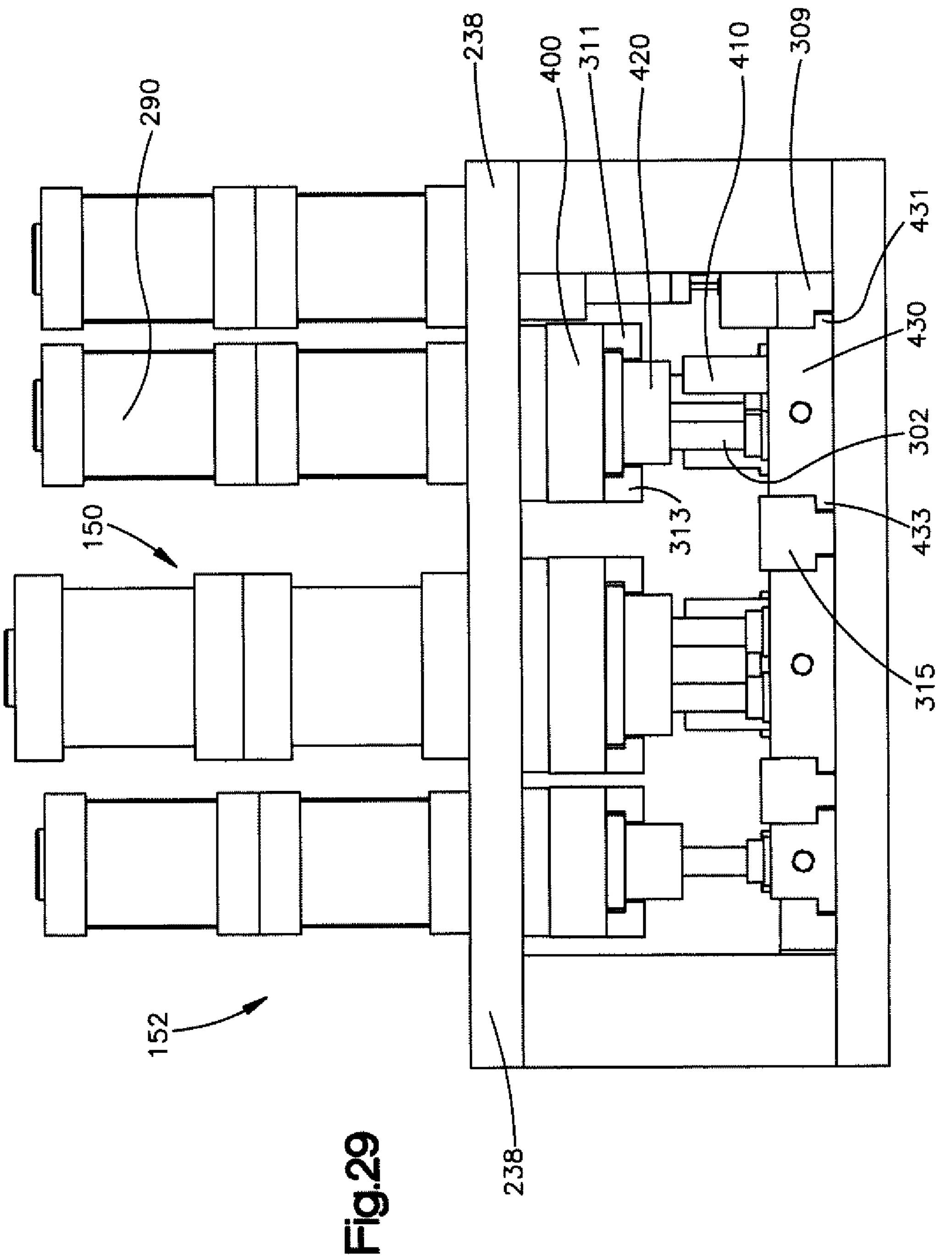
FIG. 29 is a side elevation view showing support for moveable die and anvil supports.

As seen in FIG. 15, a first pair of die and anvil assemblies are moveably supported by an elongated support 494 which extends to an opposite side of the strip stock path of travel where a second pair of die and anvil assemblies are moveably coupled to said elongated support. FIG. 29 illustrations stationary guides or ways 309, 311, 313, 315 that guide the die support 420 and the anvil support 430 for back and forth movement in response to user adjustment of the crank. As seen in the figure, the anvil support 430 has two elongated flanges 431,433 that extend into the ways 309, 315 and slide back and forth in those ways.

Figure 24:
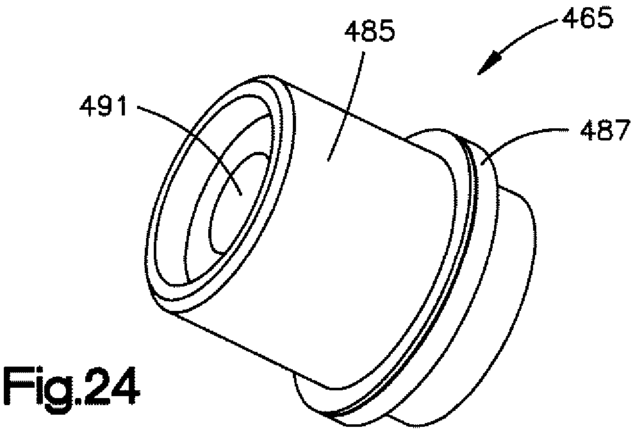
FIG. 24 is a perspective view of a spacer assembly used in relatively positioning die and avil assemblies at a corner forming station.
Figure 25:
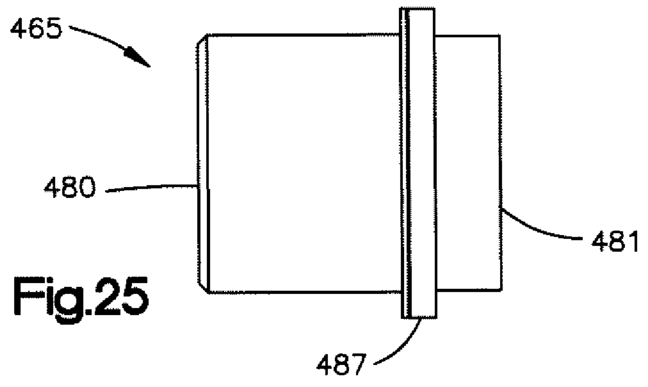
FIG. 25 is an elevation view of the spacer assembly shown in FIG. 24.
Figure 26:
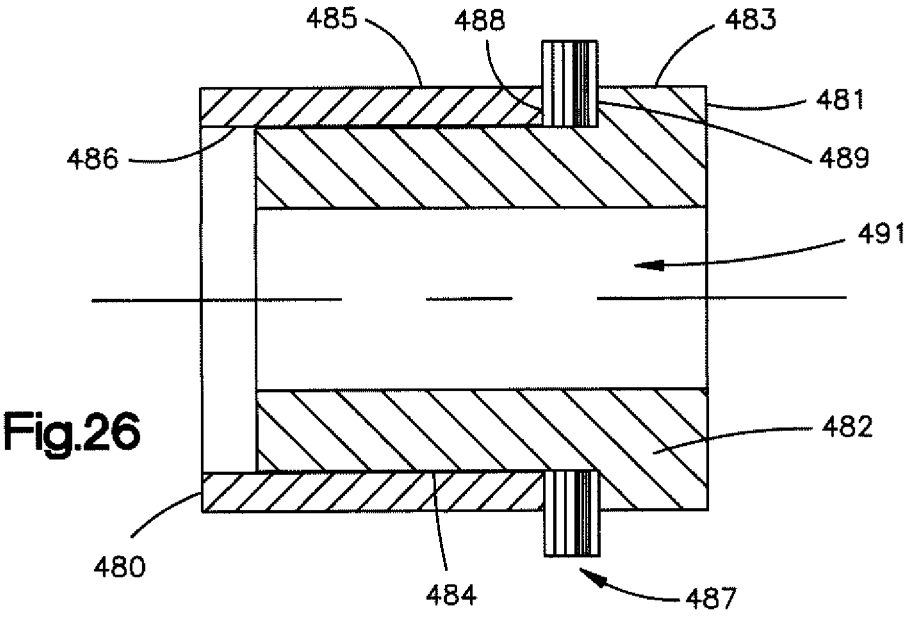
FIG. 26 is a section view of the spacer assembly shown in FIGS. 24 and 25.

As seen most clearly in FIGS. 24-26 the adjustable spacer 465 comprises a metal body 482 (preferrably hardened tool steel) having first and second outer cylindrical surfaces 483, 484 separated by a stepped region. A metal (preferably hardened tool steel) annular sleeve 485 has an inner diameter 486 that fits over a small diameter cylindrical surface 484 of the body 482, and one or more annular spacers or shims 487 that define a spacing between one end 480 of the sleeve and an abutment 489 at the stepped region of the body 482.

The spacers or shims are made of stainless steel and can be chosen from a kit of such spacers having different thicknesses of, for example 0.002 inch, 0.005 inch, 0.010 inch, 0.020 inch, 0.025 inch and 0.030 inch. By adding shims together, a length of the adjustable spacer between the two surfaces 480, 481 can be chosen to be between 1.300 to 1.600 inch.

The body 482 has a throughbore 491 to accommodate an elongated threaded connector 490 having a hex head (FIG. 15). The hex head connector 490 butts against a washer that engages the respective removable stops 478, 479 and the connector extends through the stop, the bore 491 of the adjustable spacer 465 and threadingly engages a corresponding threaded opening in the anvil support 430.

The removable stops 478, 479 and can be removed from the mount 474, 475. As discussed below, the ram stops 410 are generally cylindrical and have threaded bases that screw into openings in the anvil supports 430, 432. By removing the removable stop 478 and spacer 465 on one or both sides of the strip stock travel path, the anvil support 430 and corresponding die support 420 can be removed as a unit by sliding them through the fixed ways. The plate 494 extends the length of the punching station 104 and supports ways or guides for other die supports that form part of the punching station 104. An output end of the screw 470 supports a pulley wheel 496 that engages an aligned pulley wheel (not shown) by means of a pulley to transmit the rotation applied by the user to a separate drive for moving other die sets that form muntin bar notches and a leading frame end 62.

Exemplary ram limiting stops 410 have a fixed cylindrical portion or base 500 made of hardened tool steel attached to the anvil support 430 by means of a threaded part 415 of the base and a threaded opening in the anvil support. A thickness T of the removable top portion 510 is used to control a total length of the stop 410, and therefore, the extent of die movement and consequently deformation of the strip S. In the exemplary embodiment, the thickness of the removable cylindrical portion 510 varies over a range to adjust downward movement of the die by as much as 0.010 inch. (ten thousandths of an inch) Stated another way, for a stainless strip S a thickness of the removable portion 510 provides adequate deformation with a stop thickness T and for Tin Plate strip of the same thickness, a removable stop is chosen having a thickness T+0.004 inch to reduce the energy transmitted to Tin plate strip.

The exemplary removable portion 510 of the stop 410 is also made of hardened tool steel and a centrally located recess 512 which fits over a stud 514 in the fixed portion 500 of the stop. Two magnets 520, 522 that attract the steel top 510 fit into recesses 534, 526 of the fixed portion 500 of the stop and have top surfaces flush with a top surface 530 of the fixed stop portion 500.

Figure 9:
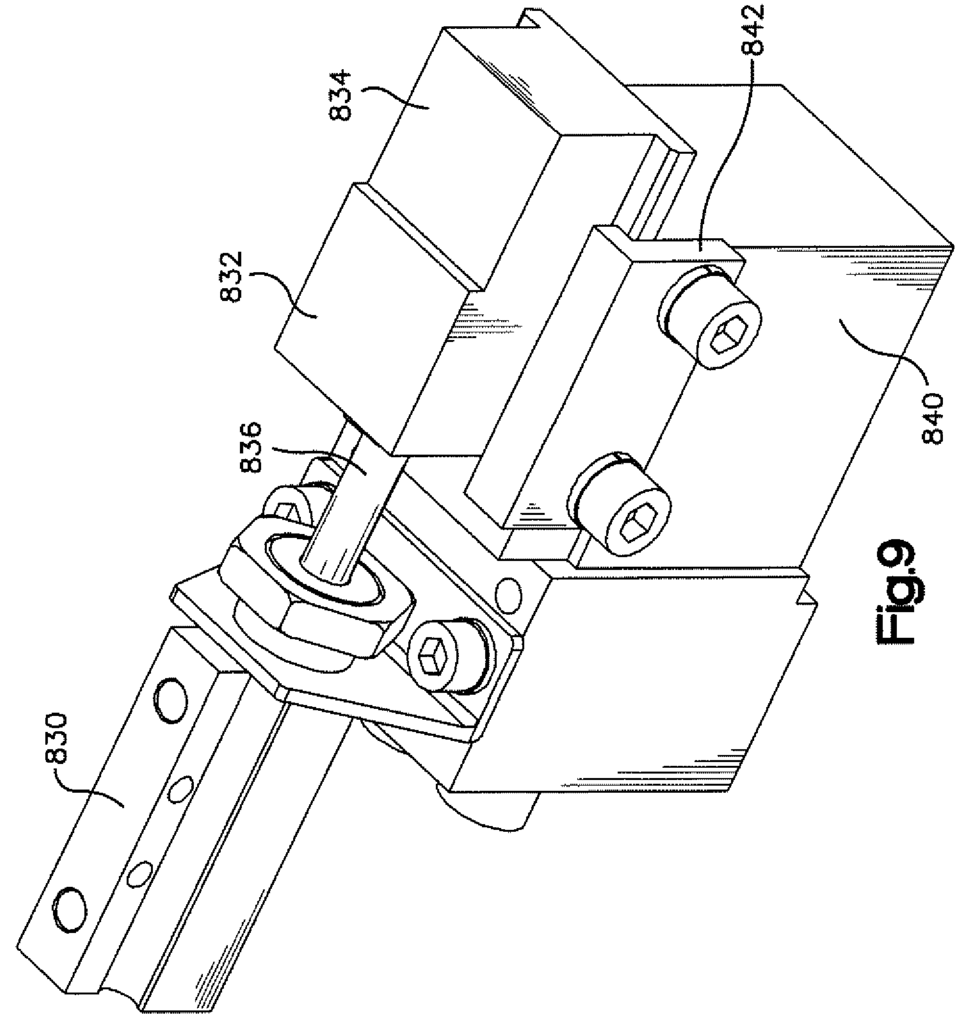
FIG. 9 is a perspective view of an alternate stop suitable for use with the corner stamping unit.
Figure 8:
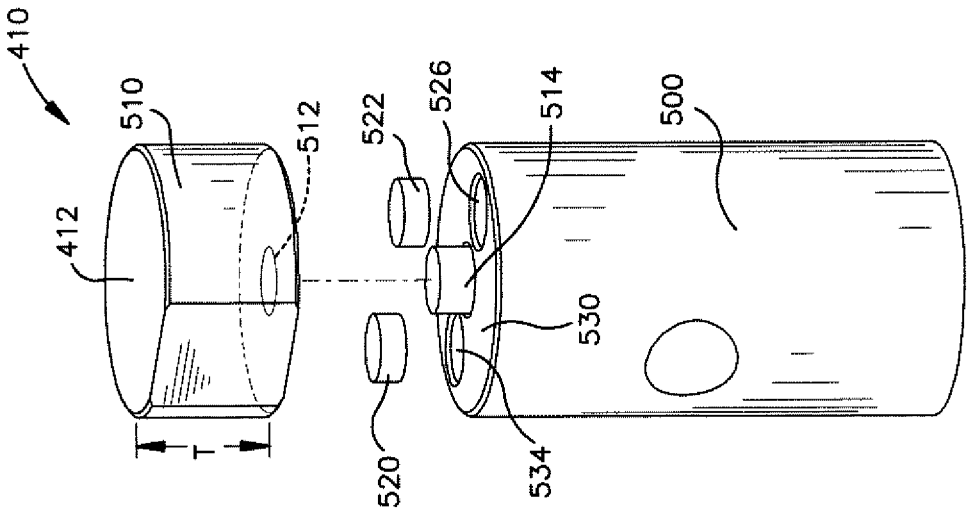
FIG. 8 is a perspective view of a stop for limiting movement of a die that deforms a metal strip passing through the corner stamping unit.
Figure 10:
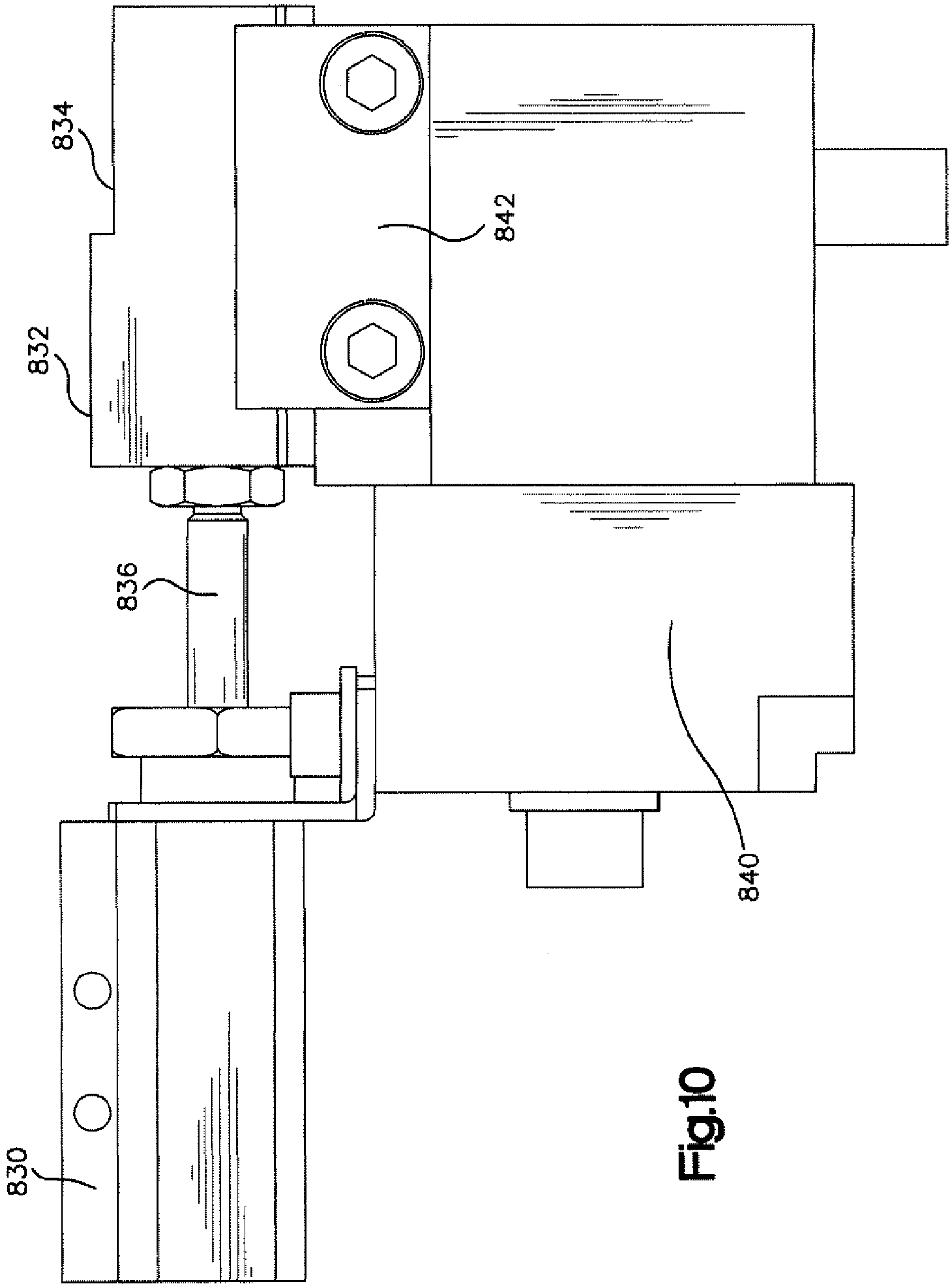
FIG. 10 is side elevation view of the alternate stop of FIG. 9.

An alternate implementation of a ram stop is depicted in FIG. 9. This figure depicts a stop assembly includings a moveable stop on each side of the strip and wherein the moveable stop has a stepped surface generally parallel to a plane of the strip which defines first and second limits of travel of the ram assembly. The stop assembly includes an actuator 830 which operates under the direction of the controller 120 to move a shaft 836 which in turn selectively moves first or second regions 832, 834 of the stepped surface of the stop along a path dictated by a guide 842 supported by a base 840 of the moveable stop into a position for contact by the lower surface of the die support.

In the exemplary embodiment the punch drives for moving the plate 400 are air actuated drives. In an alternate embodiment, rather than precisely controlling a degree of length of travel the dies move in response to actuation of the air actuated drives, in accordance with an alternate embodiment, the pressure supplied to the air drive is adjusted by an output from the control station 120. In yet another alternative example embodiment, the drive cylinders 290 and 292 are hydraulically actuated cylinders energized by a supply pump and motor.

The exemplary system limits movement of the dies in a somewhat empirable fashion to achieve a best result of corner fabrication. The correct amount of energy is determined by the use of a fold force gage. A goal is to achieve the same fold force regardless of material, and make the adjustments to the stop height dimension to achieve that goal.

Rather than a use of adjustable height stops, the drive comes in contact, an alternate embodiment uses an eccentric drive having a cam follower so that the throw of the drive is readily adjustable. In this embodiment the die stops would not be used as previously described above. Rather the length of travel is controlled by the position of the crank arm on a crank hub. The crank arm converts rotary motion to a linear motion. If the position of the crank arm is further away from the center of rotation of the crankshaft then the length of travel will increase. If the crank arm position is closer to the center of rotation of the crankshaft then the length of travel will decrease. By controlling the crank arm position, the effective stroke and length of travel can be controlled.

Another alternate embodiment has a die support 420 constructed from two wedge shaped mating pieces. One of the wedge shaped pieces is driven in and out horizontally with a servomotor. This horizontal motion would result in a net increase or decrease in length of travel when the die support 420 comes in contact with stops 412

An alternate example embodiment of the punch station 104 is depicted in FIG. 11. This station has two dedicated stamping stations for forming the corners 32*a*, 32*b*, 32*e*, 32*d*. Two stamping stations 148, 148' are capable of stamping the three corners 32*b*, 32*c*, 32*d* that are separated from the tongue. And the two stamping stations 150, 150' are capable of stamping the corner 32*a*. For one material, stainless steel for example, the stations 148, 150 are set up for forming the corners. If a demand for tin plated steel frames is subsequently being satisfied (by the controller 120 choosing an appropriate supply roll at the stock supply station 102 for feeding through the line) the control station forms the corners by selective actuation of a second set of stamping stations 148', 150' that deform the strip in a slightly different manner. Alternate different means of adjusting the deformation at the two stations 148, 148' have been discussed above.

Figure 22A:
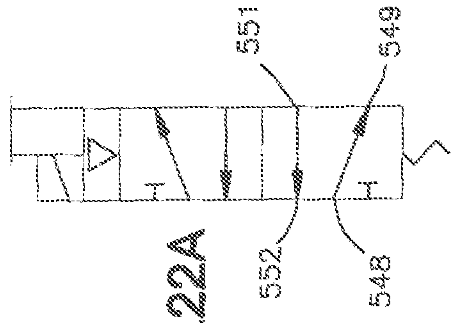
FIGS. 22 and 22A are a pneumatic schematics showing solenoid valves that selectively supply air to air actuated cylinders at the punch station.
Figure 22:
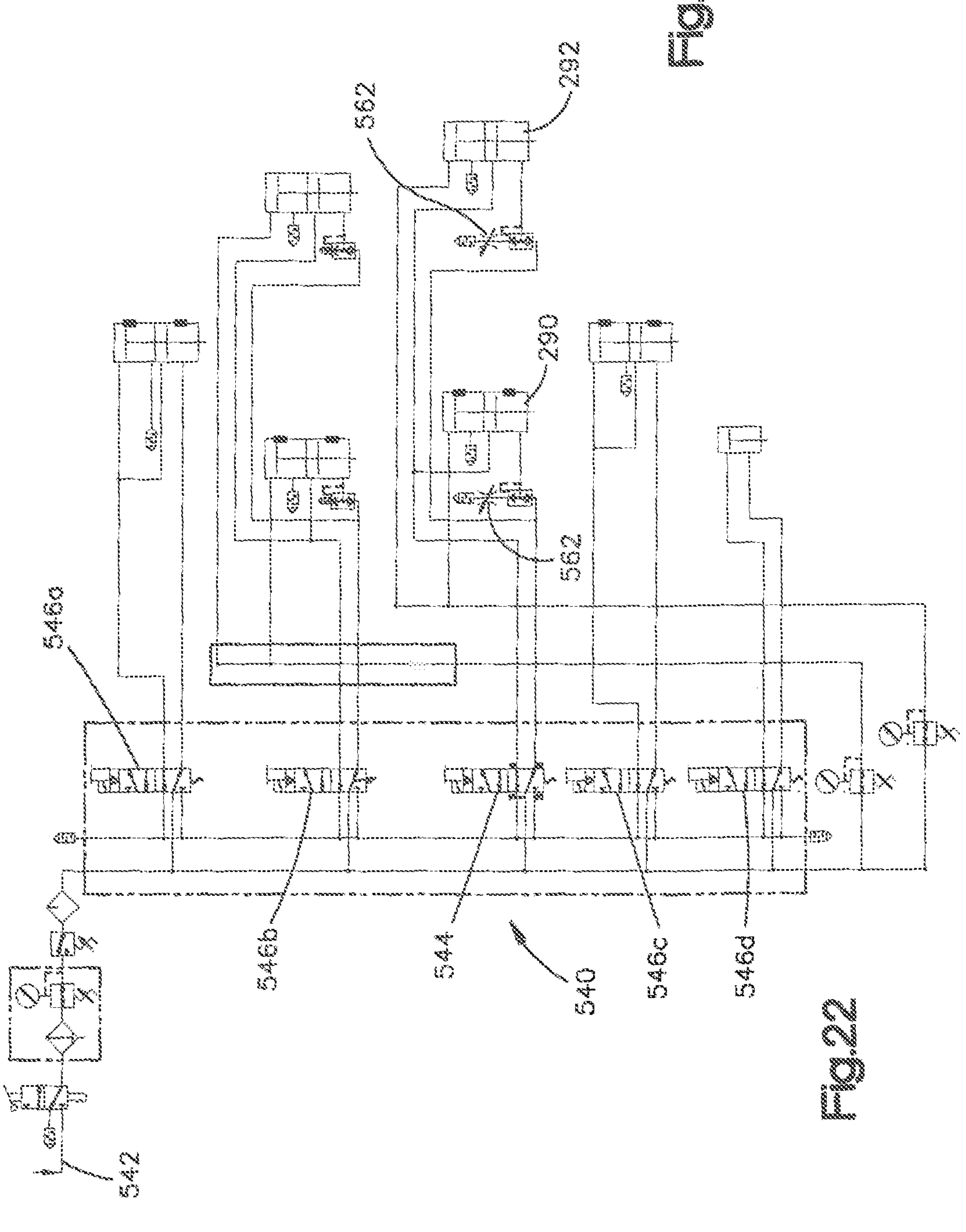

FIG. 22 is a schematic depiction of a pneumatic system 540 for pressurizing the dual acting air cylinders 290, 292 at the punching station 104. The two air cylinders 290, 292 are coupled to an air source 542 through a solenoid operated valve 544 that delivers air at 80 psi to the air cylinders having a piston of ⅝ inch diameter and a throw distance of ⅝ inch. The solenoid operated valve 544 responds to control outputs from the controller by switching back and forth from a position in which the plate 400 is raised and a position which forces the plate downwardly to notch the strip S. Other solenoid operated valves 546*a*, 546*b*, 546*c*, 546*d* are also depicted in FIG. 22. The ports for the valve 544 are labeled in detail in. FIG. 22A wherein port 1 has been labeled with reference character 548, port 2 with reference character 549, port 3 labeled with reference character 551 and port 4 with reference character 552.

Figure 23:
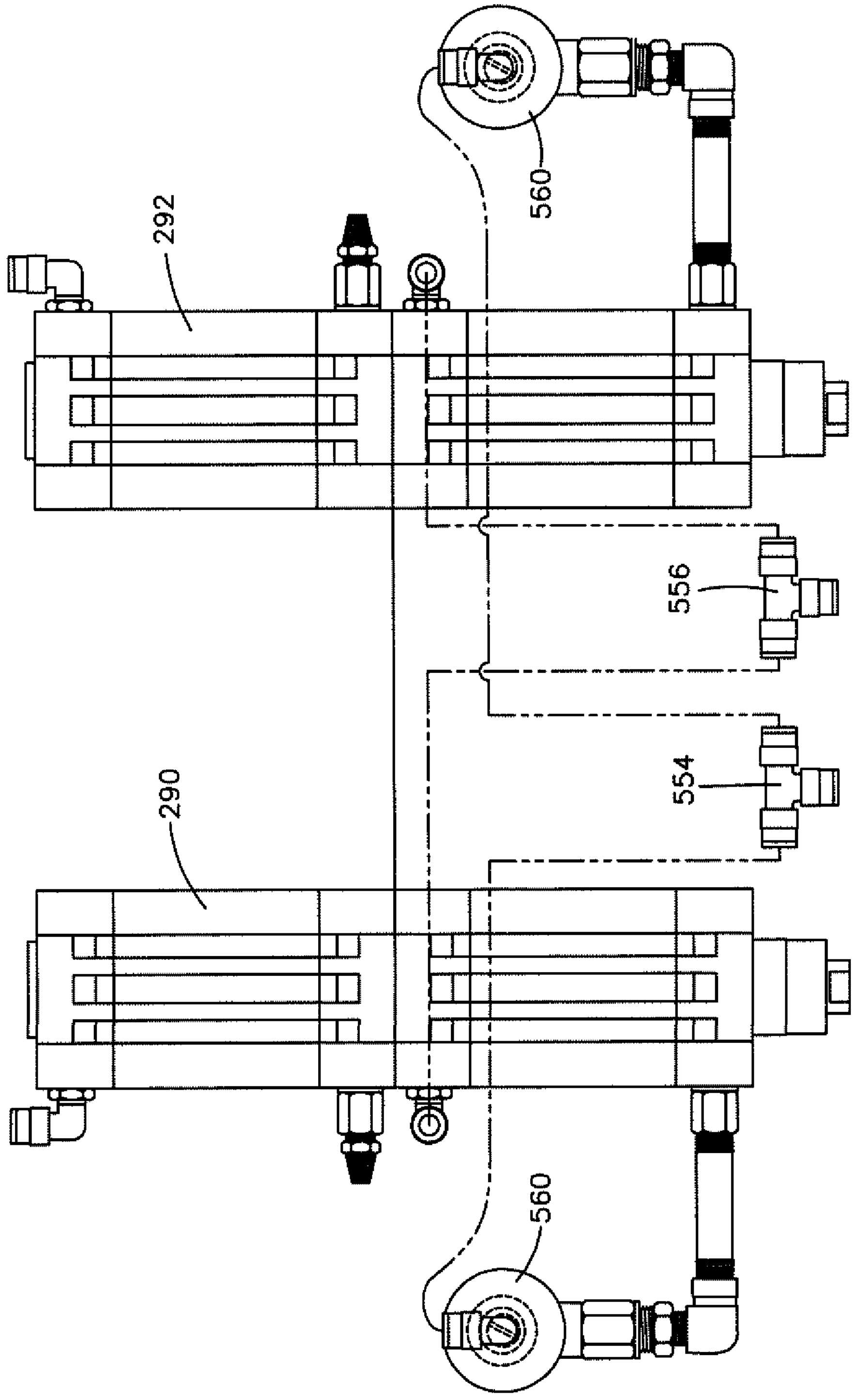
FIG. 23 is a schematic showing two air actuated cylinders for forming corners that having a flow control valve that limits a rate of air escaping a pressurized chamber of the cylinder.

Turning to FIG. 23, one sees the connections to the two air driven cylinders 290, 292 in more detail. A pair of T connectors route air passing through the solenoid valve 544 to the cylinders. A first T connector 554 is connected to port number 2 on the solenoid valve 544. When pressurized air is provided by this port, the cylinders lift the plate 400 up against the action of gravity. When a second T connector 556 receives pressured air from port number 4 of the valve 544 the cylinders drive the plate 400 downwardly in a controlled manner. This arrangement allows one connector (554 for example) to pressurize one of the internal air cylinder chambers of both air cylinders 290, 292 while another chamber of the cylinder is vented or exhausted through the other connector (556 for example) then through the solenoid valve and then to atmosphere.

In the exemplary embodiment, the two air cylinders 290, 292 are connected to an improved quick exhaust 560 (FIG. 23) available from Festo as part number and SE-1/2-B. The quick exhaust 560 has a threaded exhaust port 561. A flow control 562 is threaded into the exhaust port of the quick exhaust. The flow control has an integrated sintered silencer 653. An exemplary flow control 562 is available from Festo as part number GRE-1/2.

A goal of use of the flow control 562 is to not noticeably slow the speed of the dies but improve the consistency of the strikes by the die against the strip. Stated another way, the flow control 562 allows for a known or regulated control of the exhaust to allow for a substantially repeatable load force applied to the strip S by the dies and anvils of the punch station 104.

A study of the operation of the corner notching has led to a better understanding of how various factors affect corner fold quality. Generally, after a production line is converted from Tin Plate to Stainless Steel a range of fold force (forming the 90 degree angle between spacer frame segments 30 shown in FIG. 1) readings vary by about 5 oz. That is, the force needed to bend the severed frame from its original elongated linear strip form to a closed form vary over a range of about 5 oz for both stainless steel and tin plated steel. It has been found that after an extended period of use the fold force experienced can often have a range of over 10 oz. This difference is attributed to changes in the system over time such as clogged flow paths in the pneumatic circuit coupled to the cylinders 290, 292 and to structural wear in the components forming the punch station 104, such as the guide rods 302. As the components wear, the system friction is reduced. This reduced friction results in inconsistent acceleration of the dies.

The die stroke is about ⅜ inch. The travel time from an up limit switch signal to a down limit switch signal is about 7 milliseconds. These limit switches are attached to the air cylinder body and detect when an inner piston is up (retracted) or/down (extended) position. During this 7 millisec time the acceleration and final velocity of the dies (in the downward punch direction) is affected by several factors. Gravity is accelerating the dies. Friction is resisting the acceleration. Air pressure coming into the cylinders is accelerating the load. Air pressure on the exhaust side of the cylinder is resisting acceleration. The shearing force required to notch the strip is trying to stop the load.

Gravity is a constant. Its force will not change over time. Friction should be fairly consistent over a relatively short time period. However, friction will change over time as wear takes place. Friction may also be sharply increased or decreased with press alignment and die binding. Adjustments to the press can be made which inadvertently apply a mechanical bind to the system. Air flow in and out of the cylinders will also be fairly consistent over a short time period. Air flow characteristics however can change dramatically over time. This change is experienced as mufflers or silencers become plugged, air flow is restricted.

When the air supply to the punch station 104 is removed, the dies will fall due to gravity. If the air supply is toggled on and off several times and one observes how the dies fall, one will see some variation in the manner in which the dies fall. Sometimes the die will fall quickly, and sometimes they may fall slower. In some cases they may only fall part way, pause and then fall the rest of the way. Using pneumatics to consistently accelerate a load that will freefall, leads to some small variations. Since air is a compressible fluid, small changes in external conditions such as mechanical binding or air flow restrictions can result in noticeable changes in the consistent delivery of energy to the punch driver system. Adding the flow control 562 after the quick exhaust achieves much greater consistency in both time and load applied to the strip S by the dies.

Set up of the flow control is to some degree empirical but can be simplified if the actual force of engagement between the die and the strip S is measured. This can be performed using a force gauge commercially available from GED Integrated Solutions Inc., assignee of the present invention. (part number 2-24472) The Exemplary flow control 562 has an adjustment feature. By turning a screw. The flow control has a tapered cone spaced from a mechanical seat. The closer the cone is to the seat, the more restricted is the airflow. on the control, the flow path through the control can be adjusted for maximum flow. Best results are obtained if the flow is somewhat restricted however, so that in one exemplary system best results were obtained by rotating the screw three turns, resulting in approximately 30% reduction in flow. The exemplary flow controls have about 10 full turns (360 degrees) from open to closed, so 3 turns from open would be about 30% restriction. The data in Table 1 below was obtained at this setting and measures the actual measured force applied to a gauge in ounces for twelve readings. Note the range from the maximum to the minimum is only 5 ounces compared to values measured of as much as 12 ounces for a non flow restricted exhaust. This data is obtained by using the 2-24472 fold force gauge.

TABLE 1

| Flow restricted Corner 1 | Corner 2 | Corner 3 | | |
|---|---|---|---|---|
| 48 | 53 | 48 | Minimum | 48 |
| 48 | 51 | 48 | Maximum | 53 |
| 49 | 50 | 48 | Range | 5 |
| 48 | 51 | 49 | Average | 49 |

Crimper Station 108

Figure 16:
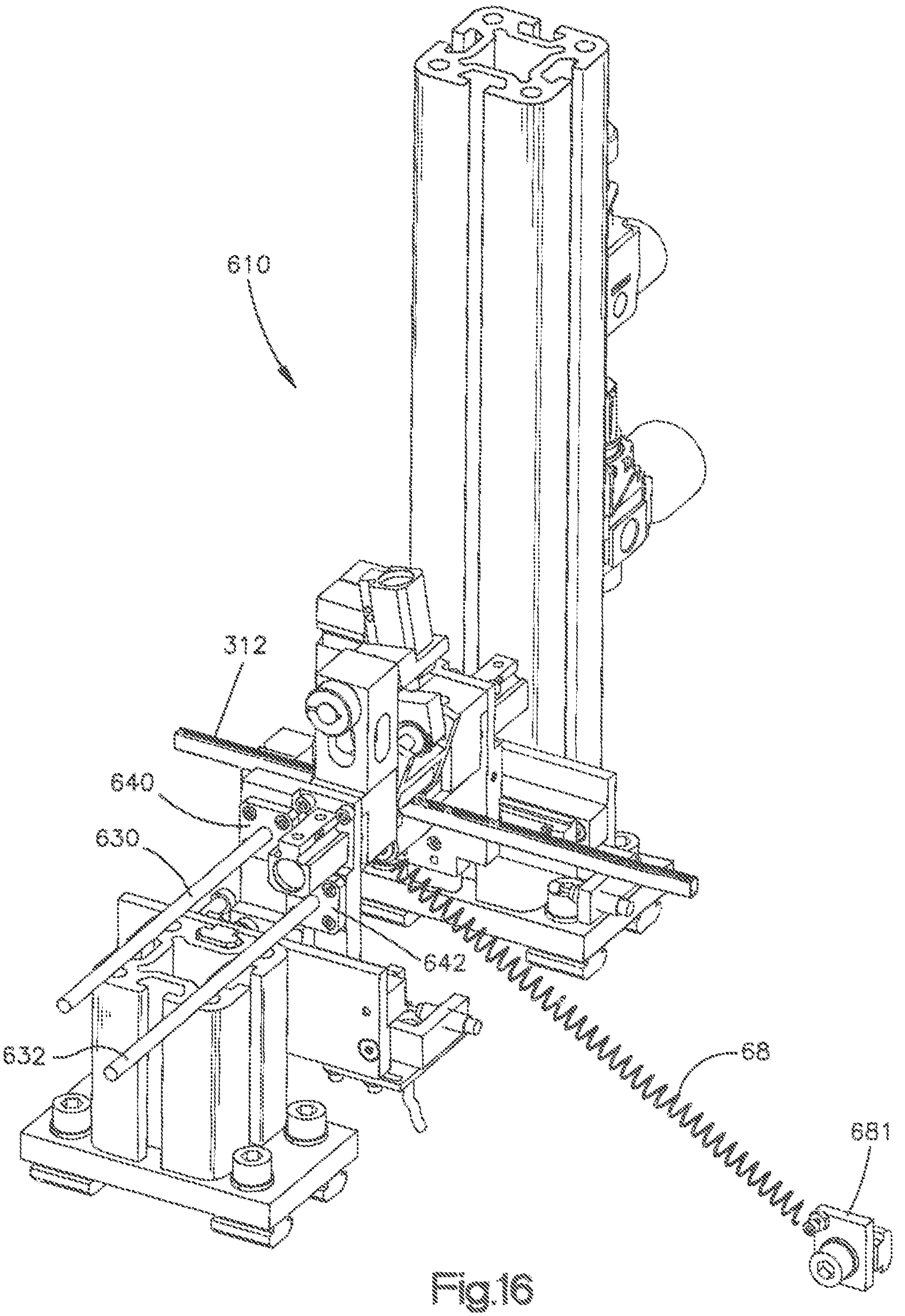
FIG. 16 is a perspective view of a crimp station.
Figure 17:
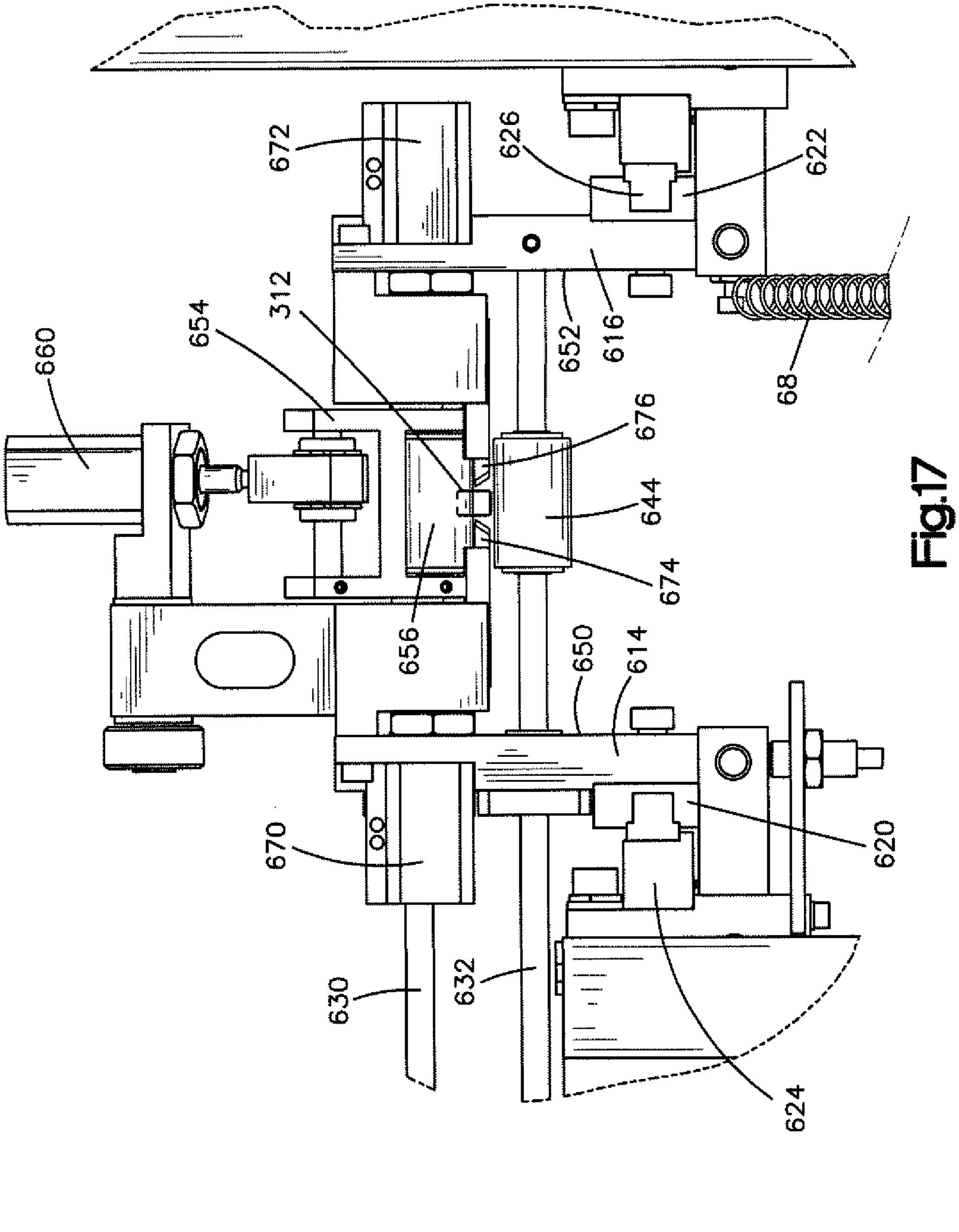
FIG. 17 is a front elevation view of the crimp station.

A crimper assembly 610 (FIGS. 16, 17, and 18) is connected to an output end of the roll former station 106 and processes roll formed strip 312 output from the roll forming station 106. The crimper assembly has two movable carriages 614, 616 that are coupled to linear bearings 620, 622 which move along spaced apart generally parallel tracks or guides 624, 626 that extend along the exit side of the roll former.

The carriages 614, 616 are connected by first and second horizontally extending rods 630, 632 that pass through openings in the carriages 614, 616. The rods are anchored to one carriage 616 and on an opposite side of the path of travel the rods pass through bearings 640, 642 supported by the carriage 614. This arrangement allows the spacer frame width created by the roll former to be varied with only minor adjustments to the crimper assembly 610.

A first steel roller 644 mounted on the lower rod 632 supports the spacer frame 312 as it exits the roll former. Springs (not shown) engage ends of this roller and are compressed between two side plates 650, 652 and the roller. This arrangement keeps the roller centered regardless of the spacer size being formed. The height of the crimper assembly 610 in relation to the roll former is adjusted so that the lower roller 644 just touches the bottom of the spacer frame as the spacer frame exits the roll former.

Pivotally mounted on the upper rod 630 is a yoke 654 which supports an upper roller 656. The yoke pivots on the upper rod. The upper roller is directly above the lower roller. An air cylinder 660 is mounted to the yoke 654. The amount of force the cylinder 660 applies to the upper roller is controlled by a precision regulator. If the cylinder does not apply enough pressure on the roller, the roller will not engage the spacer frame corners. If the upper roller 656 does not have enough down force, the cross-travel of the crimper carriage will force the upper roller out of the groove of the spacer and hit late or not at all firmly enough and the crimp will be late or nonexistent. If the cylinder force is too high, the roller will lock into the front of the lead and the crimp will not be in the desired location.

The exemplary crimper assembly 610 also includes two horizontally oriented pneumatically actuated cylinders 670, 672. Crimping fingers 674, 676 are attached to output drive rods (Not Shown) of these cylinders. The crimping fingers 674, 676 are located so that their center line of action extends parallel to and intersections a region between the center lines of rotation of the rollers 644, 656. When the cylinders are extended the crimp fingers strike the corners or leads at their center.

Figure 20:
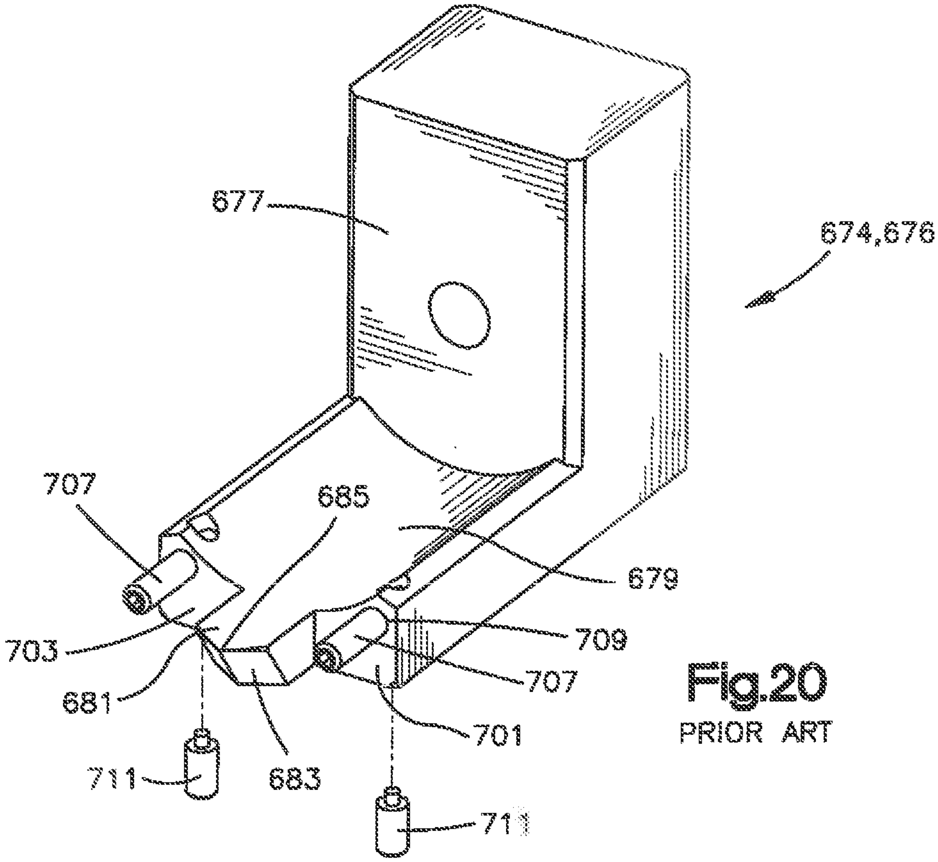
Fig.20 PRIOR ART
FIG. 20 is a perspective view of a crimping finger.

FIG. 20 is a perspective view of either of the crimping fingers 674, 676. A threaded opening in a mounting block 677 allows the fingers 674, 676 to attached to the output of the respective drive cylinder 670, 672. In one example embodiment, the crimping fingers 674, 676 are made from a tool steel or flame hardened steel as would be appreciated by one of ordinary skill in the art.

A v-shaped contact 681 has a beveled underside 683 which extends from a concave shaped portion 679 of the fingers 674, 676. A top portion of the contact 681 comes into contact with the lateral walls 42, 44 of the frame structure 16 (see FIG. 1) initially and continued movement of the fingers bring the beveled underside 683 into engagement with the frame to crease the frame in the region of weakness 52 at the notch 50.

The contact 681 further comprises an apex 685 extending to the contact's most distal point. The concave portion 679 includes two faces 701, 703, transversely located with the concave portion and spaced apart by the contact 681. The faces 701, 703 terminate at a proximal end of the contact 681. A cylindrical boss 707 extends from each of the faces 701 and 703 beyond the apex 685 of the contact 681. The cylindrical bosses 707 are received and supported by a cylindrical support opening 709 located in respective faces 701, 703 and extend beneath the concave portion 679 of the fingers 674, 676.

Securing the bosses 707 into the respective support openings 709 are respective fasteners 711. In one example embodiment, the fasteners 711 are socket head set screws. In another example embodiment, the cylindrical bosses 707 are supports sold by GED Integrated Solutions under part number 758-0220.

During operation, an apex 685 of the fingers 674, 676 centrally engages (along the z axis of FIG. 21) the area of weakness 52 by the apex 685, which continues to a prescribed first depth along the x axis of both lateral walls 42, 44 of the frame 16. Once the first prescribed depth is reached, the cylindrical bosses 707 contact symmetrically at first and second points 713, 715 about the area of weakness the lateral walls 42, 44. This removes contact between the lateral walls and apex 685, while continuing the deformation of the respective lateral wall near the region of weakness 52 along the x axis to a second depth. Both the first and second prescribed depths occur in a single advancement of both fingers 674, 676 during a single cycle. In one example embodiment, the difference between the first prescribed depth and the second prescribed depth is 0.030 inches.

The apex 685 and bosses 707 bias the frame members into the channel bounded by the side walls of the frame and provide a controlled bending operation to form the spacer frame segments 30 (see FIG. 1) when the frames are bent ninety (90) degrees. This controlled bending operation allows for the lateral walls 42, 44 in the region of the notches during and upon completion of bending to remain substantially planar with the surfaces of the frames away from the notched 50 regions.

An extension spring 68 attached to the carriage 616 ties one side of the crimp assembly to a fixture 68 on a lower roll former. This spring returns the crimp assembly 610 to a start position after a crimp operation. Two small shock absorbers 682 prevent bounce when the Crimp Assembly stops.

A pneumatic system for the crimper has four exhausts located at the ports of the crimping cylinders 670, 672. They help to achieve maximum speed from the cylinders. There are two solenoid valves. One raises and lowers the top roller. The other activates the Crimping fingers. There are two pressure regulators. A first regulator determines how hard the crimp cylinders pushes on the spacer. If this regulator is set too high it will break through the corners. If it is too low the corners will not be struck hard enough. 60 to 80 psi is the exemplary range for this regulator.

The second regulator is a precision regulator that determines how much pressure is applied to the top roller 656 by the cylinder 660, it is set properly when the roller locks into the corners and leads and the crimp is in the correct location. It is preferable when adjusting this regulator to start from the low end and increase the pressure until the desired results occur. If the crimper engages too early on the leads, the pressure is too high. If the crimps are late, the pressure is too low.

Figure 18:
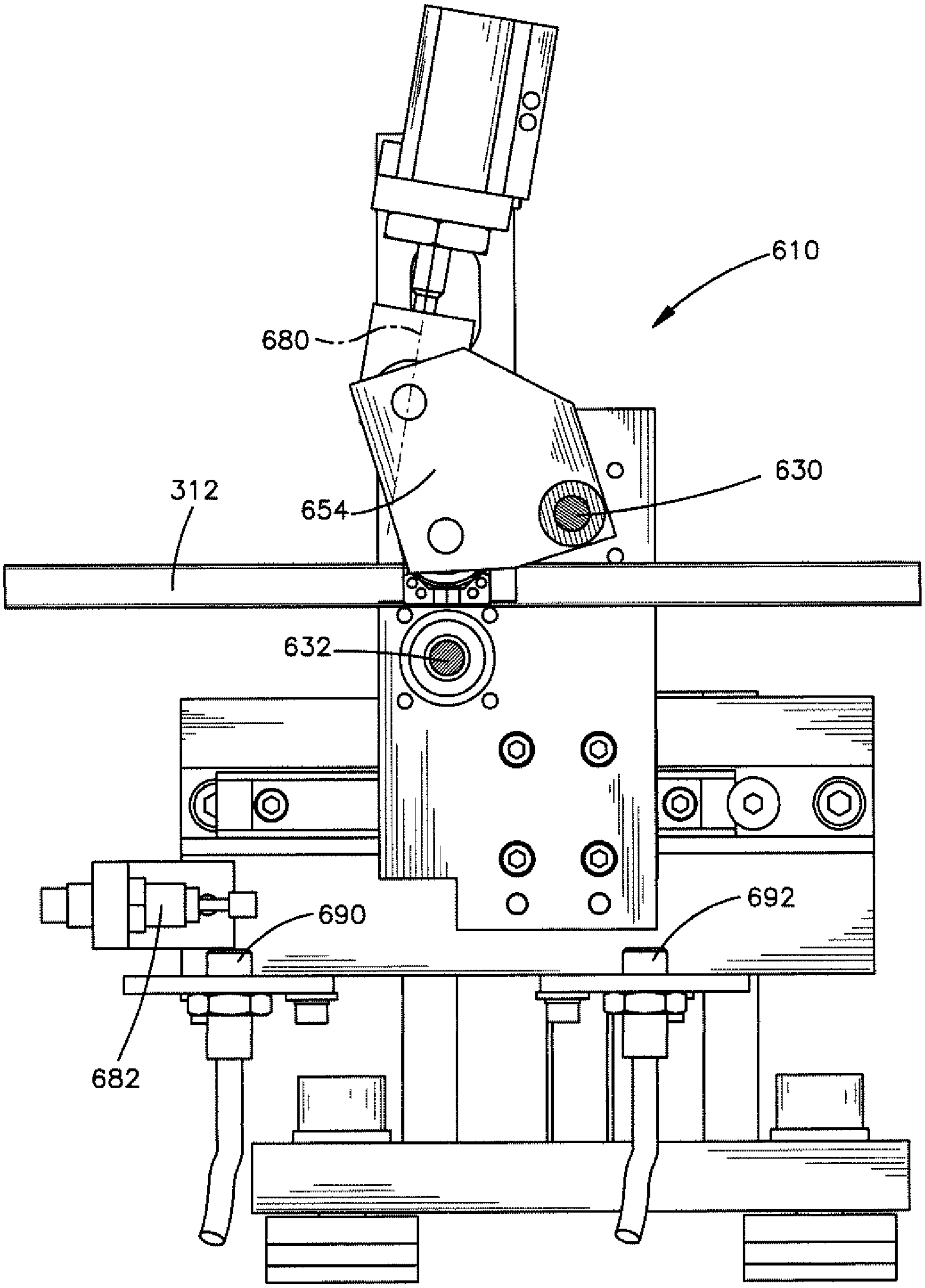
FIG. 18 is a side elevation view of the crimp station.

FIG. 18 illustrates a line of force 680 that is applied to a point on the yoke wherein a output from the cylinder 660 is pinned to the yoke 654. A force against this point exerts a moment about the pivot point of the yoke defined by the axis of rotation of the rod 630 which in turn results in a controlled downward force of engagement between the top roller 656 and the spacer frame 312. By controlling the pressure applied to the cylinder this force of engagement can be adjusted to achieve proper crimping action.

Sensor Components

When an ON/OFF switch (not shown) is set to the ON position power is supplied to the crimper assembly. After power is turned on the crimper fingers are disabled until there is material threaded through the roll former. A photoeye located near spacer frame 312 enables the crimper assembly once Material is present. If no Material is present the crimper fingers will not operate.

At the bottom of the crimper assembly on one side there are two proximity sensor switches. They are named MIN and MAX. The MIN switch 690 is the switch that is covered by bottom surface of the side plate 614 when the Crimper Assembly is not engaged with the spacer frame. The MAX proximity switch 692 is near the end of the travel when the Crimper Assembly is engaged with the spacer frame. Relays (not shown) which are actuated under the control of the controller 120 are used to control the actions of the crimper fingers.

Operation

When the top roller engages into a corner or lead the movement of the spacer frame drags the Crimper Assembly off of the MIN proximity switch. When the MIN switch is lost it causes the Crimper fingers to extend. When the Crimper Assembly triggers the MAX limit switch the Roller and Crimper fingers retract so that they are no longer touching the spacer. Once they are retracted the Crimper Assembly returns to the MIN switch position. During operation of the fingers, a crimp pressure is initially set to be at least 60 psi and a maximum pressure is set to 85 psi. A roller down pressure is set to a minimum starting pressure of 0.10 Mpa and a maximum pressure of 0.25 Mpa.

While an exemplary embodiment of the invention has been described with particularity, it is the intent that the invention include all modifications from the exemplary embodiment falling within the spirit or scope of the appended claims.

The invention claimed is:

1. Apparatus for fabricating multiple spacer frames from an elongated metal strip for use in fabricating insulating glass units, said apparatus comprising:

a) a punching station having a punch drive positioned with respect to a path of travel of the elongated metal strip for moving a die toward and away from the elongated metal strip into and out of contact with a flat surface of the elongated metal strip at controlled locations along a length of said elongated metal strip to form a notch which extends inwardly from an edge of the elongated metal strip and to deform a surface of the elongated metal strip contacted by the die and thereby form a weakened zone adjacent to the notch in the elongated metal strip at spacer frame comer location;

b) a channel forming station positioned with respect to the path of travel of the elongated metal strip for bending the elongated metal strip to include side walls;

c) a severing station positioned with respect to the path of travel of the elongated metal strip for separating a lead, spacer frame defining portion of the elongated metal strip from said elongated metal strip after the lead, spacer frame defining portion of the elongated metal strip has moved through the punching and channel forming stations; and d) said punching station comprising a control for adjusting energy transferred from the die to the elongated metal strip during contact between the die and the elongated metal strip to form said weakened zone based upon a composition of the elongated metal strip.

2. The apparatus of claim 1 wherein the channel forming station comprises a roll former for bending the strip stock to form a U shaped channel.

3. The apparatus of claim 1 additionally comprising, an uncoiling station comprising multiple coils of metal strip stock and wherein a first coil of metal strip stock is unwound to form a first elongated metal strip having a first composition and wherein a second coil of metal strip stock is unwound to form a second elongated metal strip having a second composition, said second composition different from the first composition.

4. The apparatus of claim 1 wherein the die moves in response to actuation of said punch drive to contact said elongated metal strip to form the weakened zone of the spacer frame corner location and further comprising a second die which moves in response to actuation of said punch drive to contact the elongated metal strip and form a second weakened zone at the spacer frame corner location.

5. The apparatus of claim 1 additionally comprising a die support supporting the die for movement in response to actuation of the punch drive and wherein the control comprises a stop having a contact region that engages the die support to limit movement of the die and wherein a position of the contact region of the stop is adjusted based upon the composition of the elongated metal strip.

6. The apparatus of claim 1 wherein the punch drive comprises a dual acting air driven actuator having an output coupled to the die, said actuator comprising an actuator body having first and second pressure chambers wherein a first pressure chamber, when controllably pressurized, moves said die into contact with a flat surface of the elongated metal strip to deform the elongated metal strip and form the weakened zone and further wherein the second chamber, when controllably pressurized, moves the die away from the elongated metal strip subsequent to deformation by said die; and further wherein said control comprises a solenoid valve for alternately pressurizing the first and second chambers of the actuator, a controller for operating the solenoid valve, and a combination of a quick exhaust valve and flow control valve coupled to said actuator body for allowing air to exhaust from the second pressure chamber of said actuator at a controllable rate.

7. Apparatus for fabricating spacer frames from an elongated metal strip as the elongated metal strip moves along a path of travel, said apparatus comprising:

a) a punching station having a die and a punch drive, the punch drive comprising a dual acting air driven actuator having an output coupled to the die, the actuator comprising an actuator body having first and second pressure chambers wherein a first pressure chamber, when controllably pressurized, moves said die into contact with a flat surface of the elongated metal strip to deform the elongated metal strip and form a weakened zone at multiple spacer frame corner locations along a length of said elongated metal strip and further wherein the second chamber, when controllably pressurized, moves the die away from the elongated metal strip subsequent to deformation by said die;

b) a bending station for bending the elongated metal strip into a channel shape;

c) a severing station for separating a lead spacer frame defining portion of the elongated metal strip from said elongated metal strip after the lead spacer frame defining portion has moved through the punching and bending stations; and d) a controller comprising a solenoid valve for periodically pressurizing said first chamber of the actuator to actuate the punch drive to form the weakened zone at the multiple spacer frame corner locations along the length of the elongated metal strip as said metal strip moves through the punching station and wherein a combination of a quick exhaust valve coupled to the actuator body and a flow control valve is coupled to an exhaust port of said quick exhaust valve for providing an air passageway to exhaust air from the second chamber at a controllable rate as said solenoid valve pressurizes the first chamber;

e) said punching station comprising an adjustable stop that limits movement of the punch drive by an amount that is adjustable based on the composition of the elongated metal strip to control deformation of the elongated metal strip by the die in producing the weakened zone.

8. The apparatus of claim 7 wherein the adjustable stop comprises a specified thickness stop mounted to a support.

9. The apparatus of claim 8 wherein the specified thickness stop is a magnetic material and the support includes a magnet to attract the specified thickness stop.

10. Apparatus for fabricating spacer frames from an elongated metal strip moving along a path of travel, said apparatus comprising:

a) a punching station comprising:

i) first and second dies for contacting the elongated metal strip to form notches which extend inwardly from edges of the elongated metal strip and for deforming a surface of the elongated metal strip to form first and second weakened zones adjacent to the notches in said elongated metal strip to facilitate bending of the elongated metal strip into a closed sided spacer frame;

ii) a die actuator assembly comprising first and second die supports that support the first and the second dies for movement toward and away from the elongated metal strip; said die actuator assembly comprising a punch drive for simultaneously moving the first and second dies into contact with the elongated metal strip to notch the elongated metal strip and deform said elongated metal strip to form the first and second weakened zones; and iii) first and second adjustable stops position on opposite sides of the path of travel of the elongated metal strip and having first and second contact regions, respectively, positioned in relation to the die actuator assembly so that the first contact region of the first adjustable stop is contacted by the first die support and the second contact region of the second adjustable stop is contacted by the second die support as the punch drive moves the first and second dies into contact with the elongated metal strip to deform the strip and form the first and second weakened zones; wherein, energy transferred to the elongated metal strip by the first and second dies is controlled by adjustment of a position of said first and second contact regions in relation to the die actuator assembly based oil a composition of the elongated metal strip;

b) a bending station for bending the elongated metal strip into a channel having two side walls wherein one side wall includes a first of said weakened zones and a second side wall includes a second of the weakened zones to facilitate bending of the channel in a region of said first and second zones;

c) a severing station for separating a lead, spacer frame defining portion of the elongated metal strip from said elongated metal strip after the lead, spacer frame defining portion has moved through the punching and bending stations; and (d) a controller for actuating the punch drive of the die actuator assembly to form the first and second weakened zones in said elongated metal strip.

11. The apparatus of claim 10 wherein the punching station additionally comprises first and second anvils defining a slot which accommodates movement of the elongated metal strip through the punching station.

12. The apparatus of claim 10 wherein the first and second dies each comprise a notching die portion for removing a first metal portion from the elongated metal strip and a deforming die portion for deforming a second metal portion of the elongated metal strip.

13. The apparatus of 10 wherein the first and second stops each comprise a first, constant thickness portion and a second, removable portion attached to the constant thickness portion wherein a thickness of the removable portion is adjusted to control movement of the first and second dies and therefore deformation of the strip.

14. The apparatus of claim 13 wherein the removable portion of each of said first and second stops comprises a magnetic material and defines an opening which fits over a stud in said constant thickness portion of said first and second stops.

15. The apparatus of claim 10 wherein each of the first and the second dies comprises a sharp edged ridge which help deform the elongated metal strip when the elongated metal strip is impacted by the first and second dies to form the first and second weakened zones.

16. Apparatus for fabricating spacer frames from an elongated metal strip moving along a path of travel, said apparatus comprising:

a) a punching station comprising i) a dual acting air powered actuator including first and second pressure chambers; ii) a die assembly coupled to the air powered actuator and comprising, a die mounted for up and down movement wherein pressurization of the first pressure chamber produces a downward stroke of the actuator to move the die downward into contact with a surface of the metal strip steak to form a weakened zone at spacer frame corner locations along a length of said elongated metal strip and further wherein pressurization of the second chamber by pressurized air retracts the die upward away from the metal strip; iii) a quick exhaust valve for delivering pressurized air to the second chamber during an actuator return stroke as the actuator retracts the die and exhausting air from said second chamber as pressure in the first chamber moves the die downward into contact with the elongated metal strip and iv) a flow control valve coupled to an exhaust port of the quick exhaust valve for relieving pressure at a controlled rate from the second chamber of said air powered actuator as air is pressurizing said first chamber of said air powered actuator, b) a bending station for bending the metal strip into a desired shape;

c) a severing station for separating a lead spacer frame defining portion of the elongated metal strip from the elongated metal strip after the lead spacer frame defining portion has moved through the punching and bending stations, and d) a controller for actuating the dual acting fluid powered actuator at multiple spacer frame corner locations as the elongated metal strip moves along the path of travel.

17. The apparatus of claim 16 wherein the flow control valve comprises a flow restrictor having an orifice extending therethrough and an adjustment for opening and closing said orifice.

18. Apparatus for fabricating multiple spacer frames horn an elongated metal strip as the elongated metal strip moves along a path of travel said apparatus comprising:

a) a punching station comprising:

i) an upper die and a lower die for deforming the elongated metal strip through contact with the upper and lower dies to form a weakened zone in the elongated metal strip that facilitates bending of the elongated metal strip;

ii) an upper die support mounted for movement in a transverse direction to the path of travel of the elongated metal strip for positioning the upper die relative to the path of travel of the elongated metal strip;

iii) a lower die support coupled to the upper die support for movement in said transverse direction relative to the path of travel of said elongated metal strip;

iv) an upper guide supporting the upper die support for movement in the transverse direction;

v) a lower guide supporting the lower die support for movement in the transverse direction;

vi) a punch drive coupled to the upper die support for driving the upper die into contact with the elongated metal strip;

vii) an adjustable stop coupled to the lower die support and positioned for contact with the upper die support as said punch drive moves the upper die into contact with the elongated metal strip wherein a position of contact between the adjustable stop and upper die support controls deformation of the elongated metal strip to form the weakened zone;

viii) a reference post moveable with respect to the path of travel and defining a reference surface; and ix) an adjustable spacer including a spacer body having first and second end surfaces spaced apart by an adjustable distance and trapped between the reference surface of the reference post and the lower die support for positioning of the upper and lower dies relative to the path of travel of said elongated metal strip;

b) a roll forming station for bending the strip into a desired shape; and c) a severing station for separating, a lead, spacer frame defining portion of the elongated metal strip from the elongated metal strip after the lead, spacer frame defining portion has moved through the corner punching and roll forming stations.

19. The apparatus of claim 18 additionally comprising an elongated connector that extends through the post to engage the lower die support to wedge the adjustable spacer between the post and said lower die support.

20. The apparatus of claim 19 wherein the elongated connector passes through said body portion of the adjustable spacer.

21. The apparatus of claim 18 wherein the body of the adjustable spacer comprises:

i) a first body portion having a first outer cylindrical surface basing a first diameter and a second outer cylindrical surface having a second diameter greater than the first diameter, said first body portion having a stepped region between the first and second outer cylindrical surfaces that forms an abutment, ii) a cylindrical sleeve that fits over the first outer cylindrical surface of the first body portion, and iii) one or more annular spacers that fit over the outer cylindrical surface of the first body portion between one end of the sleeve and said abutment and define a distance between the first and second ends of the adjustable spacer.

22. Apparatus for fabricating spacer frames from elongated metal strips, said apparatus comprising:

a) a punching station comprising first and second punch drives spaced apart along a travel path of the elongated metal strips and first and second dies for contacting a surface of the elongated metal strips to form a plurality of spaced apart weakened zones at corner locations along said elongated metal strips, wherein the first punch drive is coupled to the first die for moving the first die into contact with a surface of the elongated strips at a first location and wherein the second punch drive is coupled to the second die for moving the second die into contact with a surface of the elongated metal strips at a second location spaced along the path of travel from the first location;

b) a channel forming station positioned with respect to the travel path of the elongated metal strips for bending the elongated metal strips to a channel having side walls;

c) a severing station positioned with respect to the travel path of the elongated metal strips for separating a lead spacer frame defining portion of the elongated metal strips after the lead spacer frame defining portion has moved through the punching and channel forming, stations; and d) a control station for activating only the first punch drive to cause the first die to contact elongated metal strips having a first composition to form said plurality of spaced apart weakened zones and for activating only the second punch drive to cause the second die to contact elongated metal strips having a second composition to form said plurality of weakened zones, wherein said second composition is different from the first composition.

* * * * *